US007426778B2

(12) United States Patent
Nobusawa

(10) Patent No.: US 7,426,778 B2
(45) Date of Patent: Sep. 23, 2008

(54) TOOL FOR DISASSEMBLING A SHOCK ABSORBER

(75) Inventor: Hiroshi Nobusawa, Tokyo (JP)

(73) Assignee: Sanken Co., Ltd., Tokyo (JP)

( * ) Notice: Subject to any disclaimer, the term of this patent is extended or adjusted under 35 U.S.C. 154(b) by 0 days.

(21) Appl. No.: 11/637,146

(22) Filed: Dec. 12, 2006

(65) Prior Publication Data

US 2007/0137016 A1 Jun. 21, 2007

(30) Foreign Application Priority Data

Dec. 15, 2005 (JP) ............................ 2005-361310
Oct. 12, 2006 (JP) ............................ 2006-278524

(51) Int. Cl.
*B23P 19/04* (2006.01)

(52) U.S. Cl. .......................... 29/227; 29/281.1; 29/252

(58) Field of Classification Search .................. 29/227, 29/252, 255, 257, 281.6, 281.1
See application file for complete search history.

(56) References Cited

U.S. PATENT DOCUMENTS 1,346,416 A 7/1920 Newton
1,529,476 A 3/1925 Frame
3,334,405 A * 8/1967 Cann et al. .................... 29/257
3,359,618 A * 12/1967 Murphy ....................... 29/282
3,935,630 A * 2/1976 Roy ........................... 29/227
4,763,394 A * 8/1988 Decato et al. ................. 29/252
5,477,598 A * 12/1995 Borner, Jr. ................... 29/227
5,692,437 A * 12/1997 Tabain ........................ 100/231

FOREIGN PATENT DOCUMENTS

| | | |
|---|---|---|
| GB | 1 348 906 | 3/1974 |
| JP | 51-57462 | 5/1976 |
| JP | 53-56658 | 5/1978 |
| JP | 58-171274 | 10/1983 |
| JP | 61-5534 | 1/1986 |
| JP | 8-82334 | 3/1996 |
| JP | 10-249751 | 9/1998 |

* cited by examiner

*Primary Examiner*—Lee D Wilson
(74) *Attorney, Agent, or Firm*—Young & Thompson

(57) ABSTRACT

The disassembling tool (30) is constructed such that the grip 55*b* of the arm 55 is inclined relative to the fixed portion 55*a* and the bottom portion 53 downward to the base 31 at an angle θ1 (about 45° to 55°). Therefore, the vertical component Fv of the force F, which is force for pushing down the arm 55, may become larger and the horizontal component Fh of the force F may become smaller. And, the disassembling tool is prevented from slipping on the working bench S, causing easy and smooth disassembling work.

20 Claims, 18 Drawing Sheets

TOOL FOR DISASSEMBLING A SHOCK ABSORBER

TECHNICAL FIELD

The present invention relates to a tool for disassembling a shock absorber, which is a device for absorbing shock applied to a motorbike and the like.

BACKGROUND ART

A shock absorber for a motorbike as an example will be explained.

FIG. 10 are drawings showing a structure of a typical shock absorber (a no-cover type); FIG. 10(A) is an overall perspective drawing and FIG. 10(B) is an exploded perspective drawing.

A shock absorber 1 shown in FIG. 10 is one which is called as a no-cover type (or an exposed spring type) and is mainly used in road racing bikes and sport bikes. The shock absorber 1 is provided with a hydraulic damper 10 which has a cylinder 11 and a rod 13. The rod 13 projects from a distal end 11*a* of the cylinder 11 and moves forward and backward relative to the cylinder 11 in the length direction of the cylinder 11 being applied with buffer action. The cylinder 11 has a two-pronged attaching portion 12, provided with attach holes 12*a*, at its proximal end 11*b*. The rod 13 is formed with an attach ring 14 at its distal end. Usually, the attaching portion 12 of the cylinder 11 is attached to an axis arm side of a motorbike (a lower side of a motorbike) with a bolt and the attach ring 14 of the rod 13 is attached to a saddle side of the motorbike (an upper side of the motorbike) with a bolt.

A coil spring 15 is arranged around the damper 10 in a compressed state. One end 15*a* of the coil spring 15 presses against a flange portion 11*c* which is formed near the proximal end 11*b* of the cylinder 11 and the other end 15*b* of the coil spring 15 presses against a stopper 17 attached to a bottom portion 14*a* of the attach ring 14. The stopper 17 is detachably engaged with the bottom portion 14*a* of the attach ring 14 of the rod 13. As shown in FIG. 10(B), the coil spring 15 is detached from the rod 13 after detaching the stopper 17 from the rod 13.

The stopper 17 has a disk-like shape and is formed with a seating surface 18 at the periphery of the spring contact surface (the periphery of a back surface in FIG. 10(B)). The end 15*b* of the coil spring 15 is pressed against the seating surface 18. The stopper 17 has a circular opening 17*a* at its center and a slit 17*b* extending between the circular opening 17*a* and the periphery thereof. The slit 17*b* has a width larger than a diameter of the rod 13. The stopper 17 is engaged with the bottom portion 14*a* of the attach ring 14 of the rod 13 at the circular opening 17*a* thereof.

In an assembled state shown in FIG. 10(A), the stopper 17 is pressed against the bottom portion 14*a* of the attach ring 14 of the rod 13 with spring force of the coil spring 15. When the rod 13 moves backward to the cylinder 11, the stopper 17 pushes the end 15*b* of the coil spring 15. In an inside of the coil spring 15, a rubber dumper 19 is fitted on the middle of the rod 13. When the rod 13 is moved backward for a long distance to compress the coil spring 15 considerably, the rubber damper 19 is sandwiched between the stopper 17 and the distal end 11*a* of the cylinder 11 so as to exert damper action.

In such cases where such the shock absorber 1 is repaired from damages or the damper 10 is replaced owing to deterioration of oil in the damper 10 with age, the shock absorber 1 is detached from the motorbike, disassembled, repaired, assembled and then attached to the motorbike again. Also the shock absorber may be detached, in such cases where a damping ratio (a rate) of the damper 10 is adjusted or a vehicle height of the motorbike is adjusted.

An exemplary tool for disassembling the shock absorber 1 includes ones shown in FIGS. 16 to 18.

FIG. 16 is an overall perspective drawing showing an example of a conventionally used tool for disassembling the shock absorber.

FIG. 17 is a side drawing showing the disassembling tool shown in FIG. 16 to which the shock absorber shown in FIG. 10 is attached.

FIG. 18 is a side drawing showing a state in which the arm is pushed down from the state shown in FIG. 17 so as to detach the stopper from the disassembling tool.

The disassembling tool 100 shown in FIG. 16 is provided with a base 101. On one end of an upper surface (a left end of the surface in the figure) of the base 101, a L-shaped spring hold member 103 is attached. The spring hold member 103 has a base portion 104 which is attached to the base 101 with an attach pin 102 (shown in FIGS. 17 and 18) and an inserting portion 105 standing upright from the base portion 102. The inserting portion 105 is formed with a vertical slit 106 at its center. The spring hold member 103 is rotatable to the base 101 around the attach pin 102.

On another end (a right end in the figure) of the base 101, an arm 110 is rotatably attached. The arm 110 is a member made by folding a long plate to form one pair of supporting ends 110*a* and a distal free end 110*b*. The supporting ends 110*a* sandwich the end of the base 101 therebetween and are attached to the side walls of the base 101 with a bolt 107B and a nut 107N. The arm 110 rotates around the bolt 107B. Each of the supporting ends 110*a* is formed with a pin insert hole 110*c* into which each of pins 115 (a large diameter) and 116 (a small diameter) having different diameters is inserted. The pins 115 and 116 are connected each other by a ring 117. The pins 115 and 116 are used for holding the attaching portion 12 of the cylinder 11 of the damper 10 to the arm 110.

A way for disassembling the shock absorber 1 shown in FIG. 10 by using the disassembling tool 100 will be explained.

First, as shown in FIG. 17, the shock absorber 1 is placed on the base 101 with the cylinder 11 of the damper 10 being placed at a side of the arm 110 and the rod 13 being placed at a side of the spring hold member 103. Then, the attaching portion 12 of the cylinder 11 is set between the supporting ends 110*a* of the arm 110, and after aligning the attach holes 12*a* with the pin insert holes 110*c* of the arm 110, the pin 115 or the pin 116 selected on depending the diameter of the attach hole 12*a* is inserted thereto (the large diameter pin 115 is inserted, in FIG. 17). And, the rod 13 is set in the vertical slit 106 of the spring hold member 103, and, at the same time, the inserting portion 105 is inserted between the coils of the coil spring 15 (for example, between the second coil and the third coil). In this case, the spring hold member 103 rotates around the pin 102 so as to correspond to the orientation of the coil of the coil spring 15.

In this state, the shock absorber 1 is situated such that the cylinder 11 is held to the arm 110 with the pin 115 and the coil spring 15 presses against the inserting portion 105 of the spring hold member 103. On pushing down the arm 110 rotatively in the direction of an arrow α in FIG. 17, the cylinder 11 is pushed in the direction of an arrow β in FIG. 17 and then the whole of the damper 10 is moved in the direction of the arrow β. So, one end 15*a* of the coil spring 15, which presses against the flange portion 11*c* of the cylinder 11, is pushed accompanied with the movement of the cylinder 11.

As a result, the coil spring 15 is compressed between the inserting portion 105 of the spring hold member 103 and the flange portion 11*c*.

On further pushing down the arm 110 in the direction of the arrow α, as shown in FIG. 18, the damper 10 is moved in the direction of the arrow β further and the coil spring 15 is further compressed between the flange portion 11*c* of the cylinder 11 and the inserting portion 105 of the spring hold member 103. Consequentially, a gap L is formed between the end 15*b* of the coil spring 15 and the stopper 17 which is engaged with the bottom portion 14*a* of the attach ring 14. Then, the stopper 17 is moved toward the end 15*b* of the coil spring 15 so as to be disengaged from the bottom portion 14*a* and is detached from the rod 13 through the slit 17*b*. After detaching the stopper 17, the arm 110 is rotated to the initial position, then the distal end of the rod 13 is lifted upward and the coil spring 15 is detached from the spring hold member 103. Then, the coil spring 15 is detached from the rod 13. As a result, the shock absorber 1 is disassembled into the damper 10, the coil spring 15 and the stopper 17 (shown in FIG. 10(B)).

Tools or apparatuses used for compressing a spring are disclosed in the following literatures in addition to the disassembling tool 100 shown in FIGS. 16 to 18.

Tools and apparatuses for compressing a spring for automotive members are disclosed in Japanese published examined application No. S54-38360, Japanese published unexamined application Nos. S58-171274, H10-249751, utility model application No. S53-56658 and the like Tools and apparatus for compressing a spring for valves are disclosed in U.S. Pat. No. 1,529,476, U.S. Pat. No. 1,346,416 and the like.

DISCLOSURE OF THE INVENTION

Problems to be Resolved by the Invention

The disassembling tool explained referring to FIGS. 16 to 18 has disadvantages in the following (1) to (3).

(1) When the disassembling tool 100 is used placing on a conventionally used working bench S, on pushing down the arm 110 rotatively in the direction of the arrow α in FIG. 17, the base 101 easily slips in the direction of the arrow β in FIG. 17 on an upper surface of the working bench S and thus the disassembling tool 100 is easily displaced. Therefore, the base 101 has to be fastened to the working bench S by a vise and the like.

(2) Since the arm 110 stands upright, it is difficult to operate the arm 100 (to rotate the arm 110 in the direction of the arrow α in FIGS. 17 and 18). Furthermore, in order to push down the arm 110 so as to compress the coil spring 15 of the shock absorber 1, a large power is necessary.

(3) When the arm 110 is rotated downward so as to compress the coil spring 15, as shown in FIG. 18, since a center height (H2) of the attach ring 14 of the rod 13 is higher than a center height (H1) of the attaching portion 12 of the cylinder 11 (H1<H2), the coil spring 15 is easily detached from the spring hold member 103. And, the distal end of the rod 13 easily bounces in the direction of the arrow γ in FIG. 13. In order to prevent such problem, the user necessarily holds down the distal end of the rod 13 by one hand while pushing down the arm 110 by another hand, that is, the user has both hands full. So, an operation for detaching the stopper 17 after compressing the coil spring 15 has to be conducted by another person.

In order to solve the above problems, an object of the present invention is to provide a disassembling tool of a shock absorber, which has advantages such as easy operation and preventing the bounce of the rod of the shock absorber during the operation of the tool.

Means of Solving the Problems

A disassembling tool of a shock absorber according to the present invention is a tool for disassembling the shock absorber including a damper having a cylinder and a rod projecting from said cylinder and moving forward and backward relative to said cylinder being applied with buffer action; and a coil spring which is arranged around said damper and compressed between a proximal end of said cylinder and a stopper attached to a distal end of said rod. The disassembling tool comprises a base elongating in the length direction of said shock absorber; a spring hold member rotatably attached around a vertical axis on one end of said base, having a slit into which said rod is set, and an inserting portion which is inserted between the coils of said coil spring; and a lever member rotatably attached to another end of said base, having a bottom portion to which the proximal end of said cylinder is attached, and an arm which projects from said bottom portion and inclines downward to said base at its distal end.

When a shock absorber is disassembled by using the disassembling tool, the shock absorber is set on the base and the proximal end of the cylinder is set to the bottom portion of the lever member. And, the spring hold member is rotated so as to correspond to the orientation of the coil of the coil spring and then the rod is set in the slit of the inserting portion of the spring hold member, and, simultaneously therewith, the inserting portion is inserted between the coils of the coil spring. In this state, the shock absorber is situated such that the cylinder is attached to the bottom portion of the lever member and the coil spring presses against the inserting portion of the spring held member. Then, on pushing down the arm rotatively in the direction of the distal end of the rod, the cylinder is moved closer to the spring hold member thereby to compress the coil spring between the proximal end of the cylinder and the inserting portion. In this operation, since the orientation of the coil of the compressed coil spring is changed, the spring hold member is rotated so as to correspond to the orientation. Accordingly, the coil spring is tightly supported between the proximal end of the cylinder and the inserting portion of the spring hold member.

At the same time in which the coil spring is compressed, the distal end of the rod protrudes from the end of the coil spring. As a result, a gap is formed between the end of the coil spring and the distal end of the rod and thus the stopper becomes free of the spring force so that the stopper can be detached from the rod. And, when the arm is rotated upward after detaching the stopper, the cylinder is returned to the initial position and the coil spring expands to the initial length. Then, when the distal end of the rod is lifted upward so as to be detached from the spring hold member, the coil spring can be detached from the rod through the distal end of the rod. So, the shock absorber is disassembled into the damper, the coil spring and the stopper.

In the disassembling operation described above, we assume that the disassembling tool according to the present invention is set on a working bench and the arm is pushed down by a push down force F (composed of a horizontal component Fh and a vertical component Fv). And, coefficient of static friction between the under surface of the base and the upper surface of the working bench is set to μ. A maximum friction force f between the under surface of the base and the upper surface of the working bench is represented by an equation; $f=\mu N$, wherein N represents normal force. In the disassembling tool according to the present invention, since the distal end of the arm inclines downward to the base, the vertical component Fv of the push down force F becomes larger and the horizontal component Fh becomes smaller. Therefore, the horizontal component Fh of the force F may become smaller than the maximum friction force $f=\mu N$ between the working bench S and the leg plates of the base ($f=\mu N>Fh$). So, the disassembling tool is prevented from slipping on the working bench. This facilitates the pushing down operation of the arm, and the shock absorber can be disassembled with less force.

In the disassembling tool of a shock absorber according to the present invention, said spring hold member may be detachably attached to said base; and a plurality of attachment positions of said spring hold member to said base may be formed on said base in the length direction of said base.

In this case, the attachment position of the spring hold member to the base can be changed according to the length of the shock absorber to be disassembled. So, the disassembling tool according to the present invention can meet variations in length of the shock absorber.

In the disassembling tool of a shock absorber according to the present invention, said cylinder may be formed with an attaching portion having an attach hole at the proximal end thereof; said bottom portion of said lever member may be formed with a pin insert hole aligned with said attach hole; and said disassembling tool may further comprise a pin which is inserted in said aligned attach hole and pin insert hole for attaching said attaching portion to said bottom portion; wherein said pin is a stepped pin having different diameter barrels.

In this case, the pin facilitates an attaching work of the attaching portion of the cylinder to the bottom portion of the lever member. And, in such a case where the inner diameter of the attach hole of the attaching portion varies depending on the type of the damper, the stepped pin can be applied to the hole without preparing plural pins having different inner diameters. So, it becomes possible to reduce the number of parts.

In the disassembling tool of a shock absorber according to the present invention, when said shock absorber is set in said base placed substantial horizontally and said arm of said lever member is pushed down so as to compress said coil spring between the proximal end of said cylinder and said inserting portion of said spring hold member, a center height of the distal end of said rod may be lower than a center height of the proximal end of said cylinder during the pushing down of said arm; and the center height of the distal end of said rod may be rather lower or substantially equal to the center height of the proximal end of said cylinder when said arm has been pushed down to the end.

In this case, since the height of the distal end of the rod is lower than the height of the proximal end of the cylinder during the pushing down operation of the arm, the distal end of the rod is prevented from bouncing accompanied with compression of the coil spring. In addition, the user can push down the arm by one hand without holding the distal end of the rod by another, whereby the disassembling work can be conducted on one's own.

In the disassembling tool of a shock absorber according to the present invention, an angle between said bottom portion and an upper surface of said base may be set in the range of about 75° to 88° at the beginning of the pushing down of said arm.

This facilitates the applying the force to the arm for pushing down the arm.

In the disassembling tool of a shock absorber according to the present invention, said arm may have a fixed portion (a fixed end) which is fixed to said bottom portion, and a grip portion (a free end) obliquely projecting from said fixed portion; and an angle between said grip portion and said bottom portion may be set in the range of about 45° to 55°.

In this case, the arm makes it easier to apply the force to the arm for pushing down the arm than a straight arm.

In the disassembling tool of a shock absorber according to the present invention, said spring hold member may have a supporting member rotatably attached to a vertical axis on one end of said base; and a thrust plate member detachably engaged with said supporting member; wherein said supporting member has an opening into which the distal end of said rod is passed; and said thrust plate member has a slit into which said rod is set, and an inserting portion which is inserted between the coils of said coil spring.

In this case, when the shock absorber is set to the disassembling tool, the thrust plate member is engaged with the supporting member after passing the distal end of the rod into the opening of the supporting member. The supporting member and the inserting portion of the thrust plate member are inserted between the coils of the coil spring. Since the distal end of the rod is passed through the opening of the supporting member, when the distal end of the rod will be bounced accompanied with compression of the coil spring, the rod is pressed against with the upper edge of the opening, preventing the bouncing of the rod.

In the disassembling tool of a shock absorber according to the present invention, mounting screws, each having a tapered distal end, may be attached to said bottom portion facing each other, and the tapered distal ends of said mounting screws are inserted into the attach holes of the proximal end of said cylinder from both sides so as to hold the proximal end of said cylinder to said bottom portion.

In addition, the mounting screw may be a thumbscrew type screw, in which case the mounting screw can be operated by hand without using a tool.

And, said spring hold member preferably has a rod centering means for positioning said rod to a substantial center of said slit of said inserting portion in the right and left direction.

In which case, said rod centering means may comprise one pair of hold members, oppositely arranged on both sides of said coil spring, which sandwich said coil spring therebetween and also hold said coil spring downward.

In addition, an attachment position of said lever member to said base may be adjustable in the height direction of said base.

EFFECT OF THE INVENTION

According to the present invention, a disassembling tool of a shock absorber having advantages such as easy disassembling operation and preventing bouncing of the rod can be provided.

BRIEF DESCRIPTION OF THE DRAWINGS

FIG. 10 are drawings showing a structure of a typical shock absorber (a no-cover type)

PREFERRED EMBODIMENT OF THE INVENTION

Hereinafter, preferred embodiments of the present invention will be described with reference to the accompanying drawings. The shock absorber in the embodiments has the same structure as that shown in FIG. 10.

Figure 1:
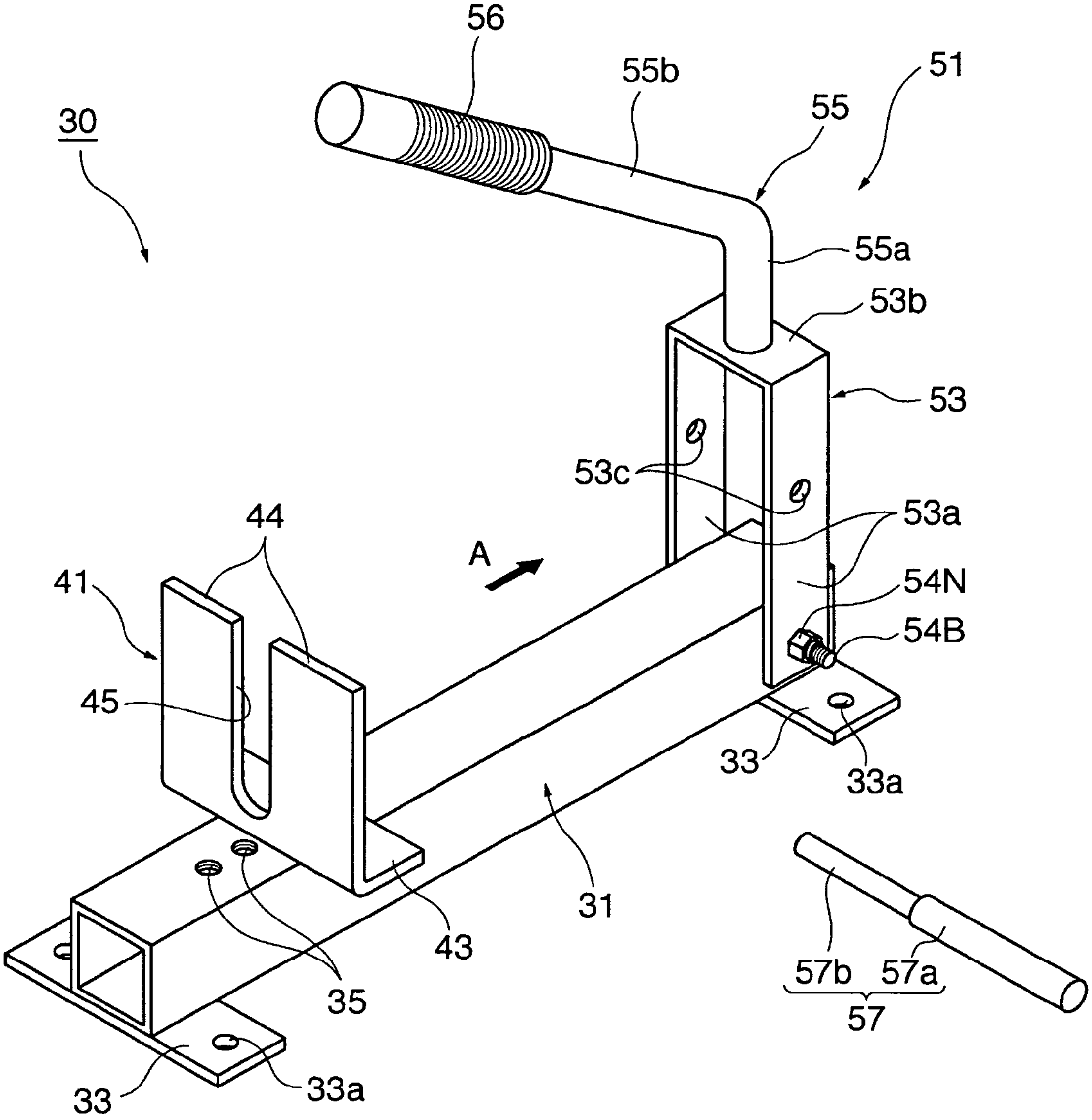
FIG. 1 is a perspective drawing showing a whole structure of a disassembling tool of a shock absorber according to the first embodiment of the present invention.
Figure 2:
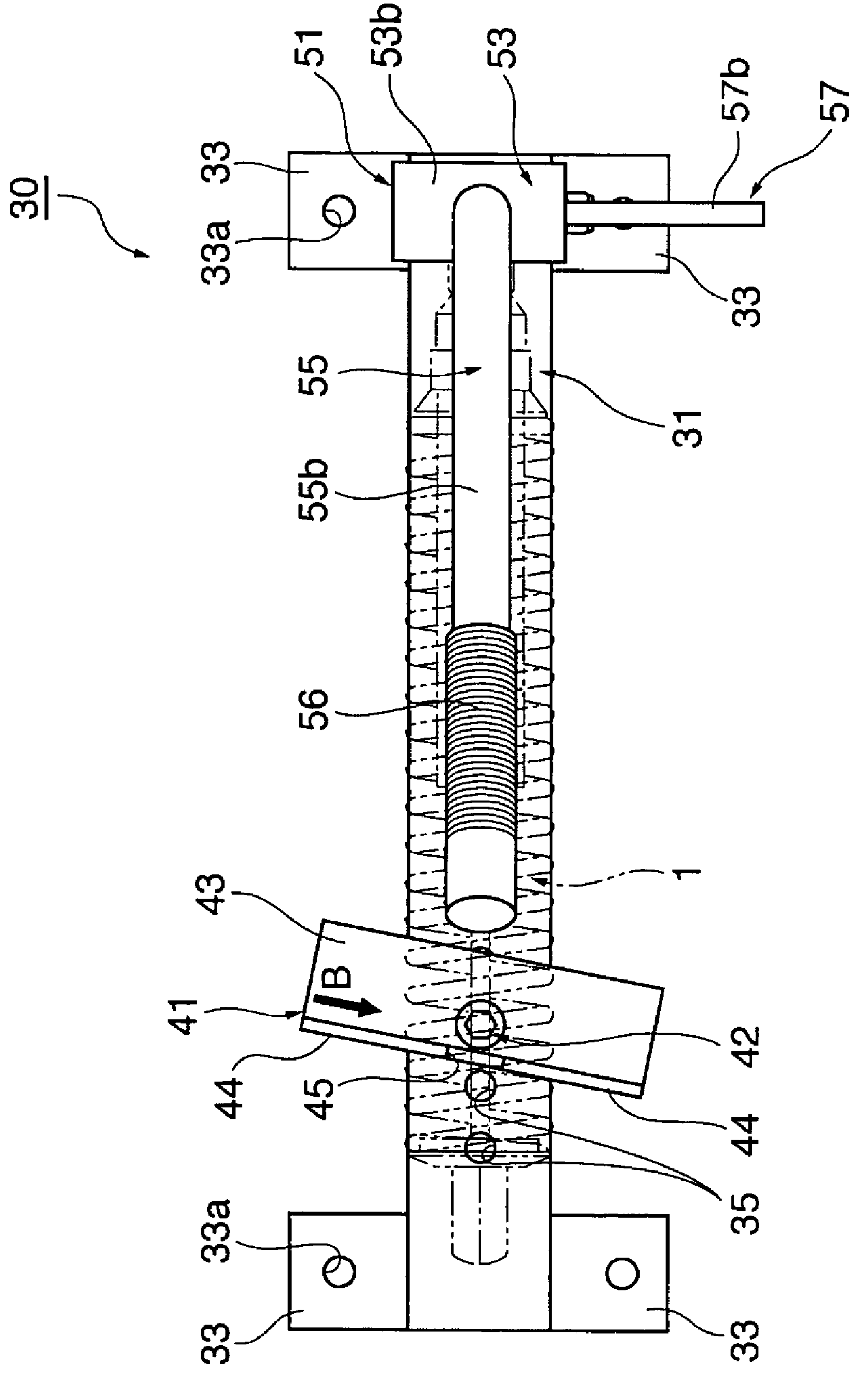
FIG. 2 is a plane drawing showing a whole structure of the disassembling tool of FIG. 1.
Figure 3:
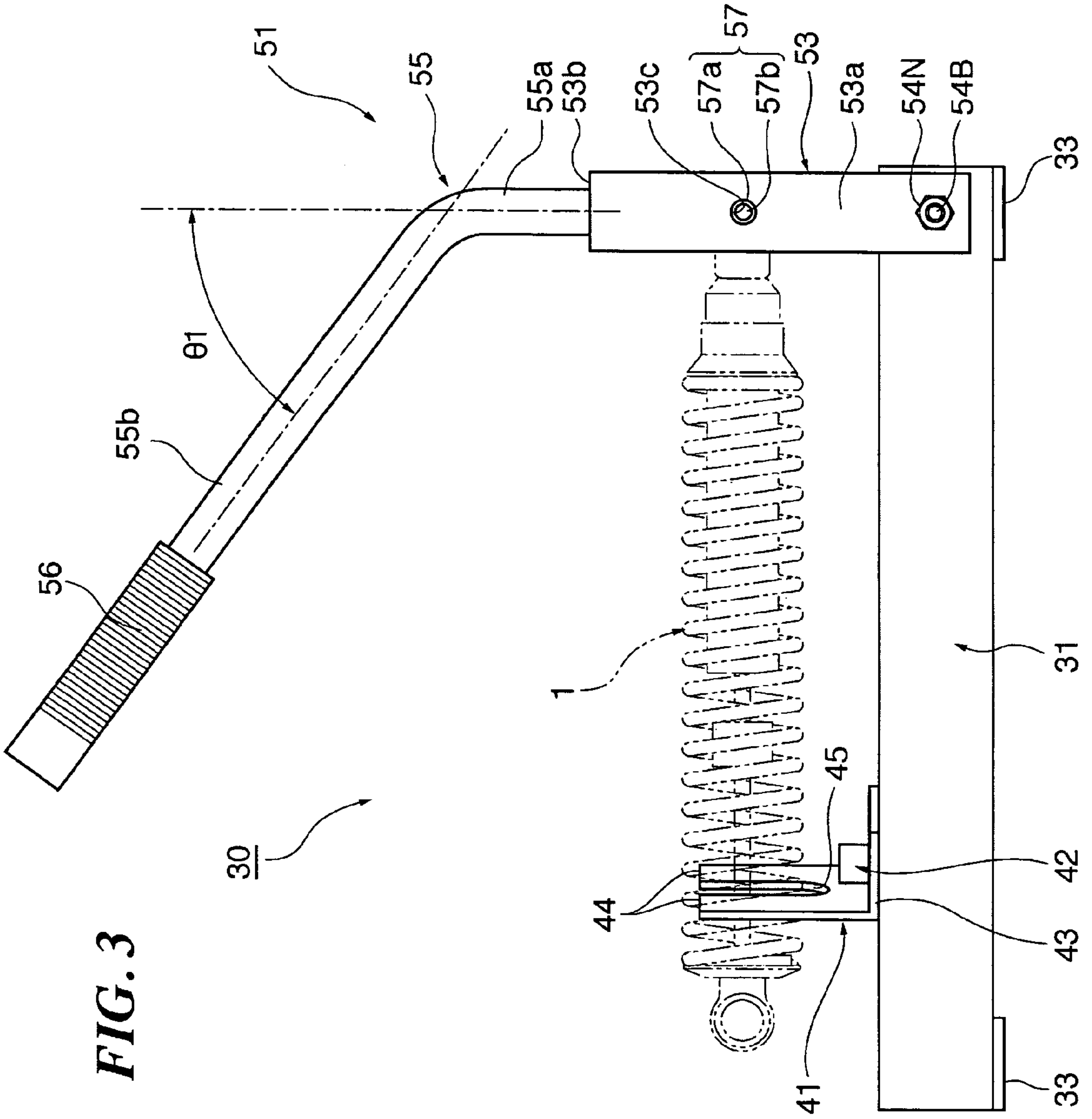
FIG. 3 is a side drawing showing a whole structure of the disassembling tool of FIG. 1.

The disassembling tool 30 shown in FIGS. 1 to 3 has a base 31 which is a hollow member having a rectangle cross-section. The base 31 has leg plates 33, having attach holes 33*a*, fixedly attached to the both ends of the under surface thereof. The base 31 is formed with plural (four, in the embodiment) female threaded holes 35 at the one end (the left end in the figures) of the upper surface thereof. The female threaded holes 35 are aligned in the longitudinal direction (the left to right direction in the figures) of the base 31 equally spaced. Each of the female threaded holes 35 is engaged with a male screw 42 (shown in FIGS. 2 and 3) for mounting a spring hold member 41 on the upper surface of the base 31. In FIGS. 1 to 3, the male screw 42 is engaged with the third threaded female hole from the end of the base 31. The disassembling tool 30 enables to change an attachment position of the spring hold member 41 to the upper surface of the base 31 by selecting the female threaded holes 35 according to the length of a shock absorber to be disassembled.

The spring hold member 41 is a L-shaped member having a base portion 43, to which the male screw 42 is penetrated, and an inserting portion 44 standing upright from the base portion 43. The inserting portion 44 has a width larger than an outer diameter of the coil spring 15 of the shock absorber 1 (as shown in FIG. 2). The inserting portion 44 is formed with a vertical slit 45 at the center thereof. The vertical slit 45 has a width larger than an outer diameter of the rod 13 of the damper 10 of the shock absorber 1 (as shown in FIG. 2). The spring hold member 41 is rotatable relative to the base 31 around the male screw 42.

On another end (the right end in the figures) of the base 31, a lever member 51 is rotatably attached. The lever member 51 has a bottom portion 53 which is made by folding a long plate to form one pair of supporting ends 53*a* and a distal end 53*b*. From the distal end 53*b* of the bottom portion 53, an arm 55 projects. The arm 55 has a fixed portion 55*a*, which is fixedly attached to the distal end 53*b* of the bottom portion 53 by welding, and a grip portion 55*b* projecting obliquely from the fixed portion 55*a*. The grip portion 55*b* has a grip 56 around the distal end thereof. The grip portion 55*b* inclines downward to the base 31 (to the lower side) from the fixed portion 55*a*. An angle $\theta 1$ (shown in FIG. 3) between the grip portion 55*b* and, the fixed portion 55*a* and the bottom portion 53, is set to be in the range of about 45° to 55°.

The end of the base 31 is sandwiched between the supporting ends 53*a* of the bottom portion 53 of the lever member 51 and fixedly attached thereto by a bolt 54B and a nut 54N. The lever member 51 is rotatable around the bolt 54B. The bottom portion 53 of the lever member 51 is formed with pin insert holes 53*c* to which a stepped pin 57 is inserted.

Figure 16:
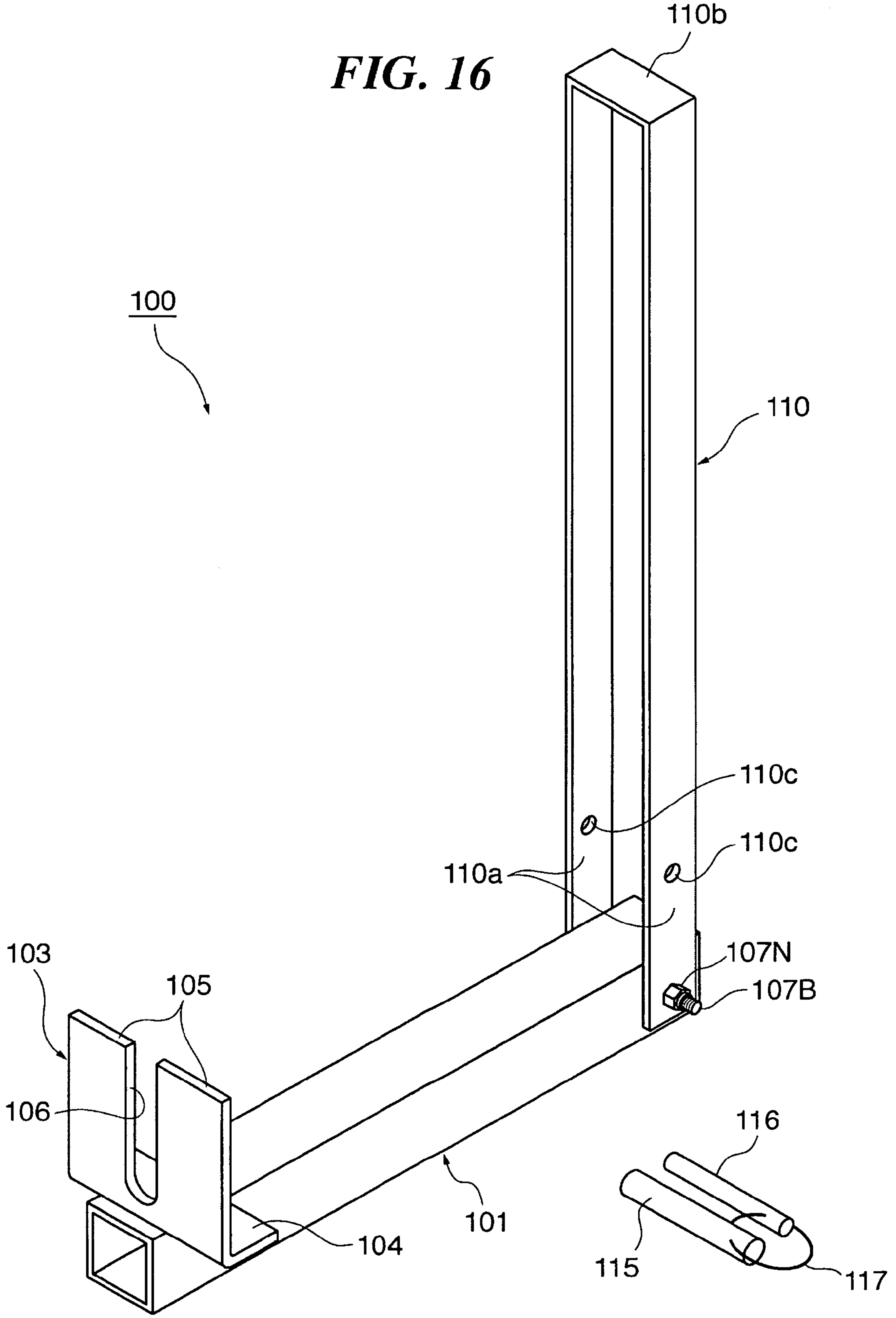
FIG. 16 is an overall perspective drawing showing an example of a conventionally used tool for disassembling the shock absorber.
Figure 17:
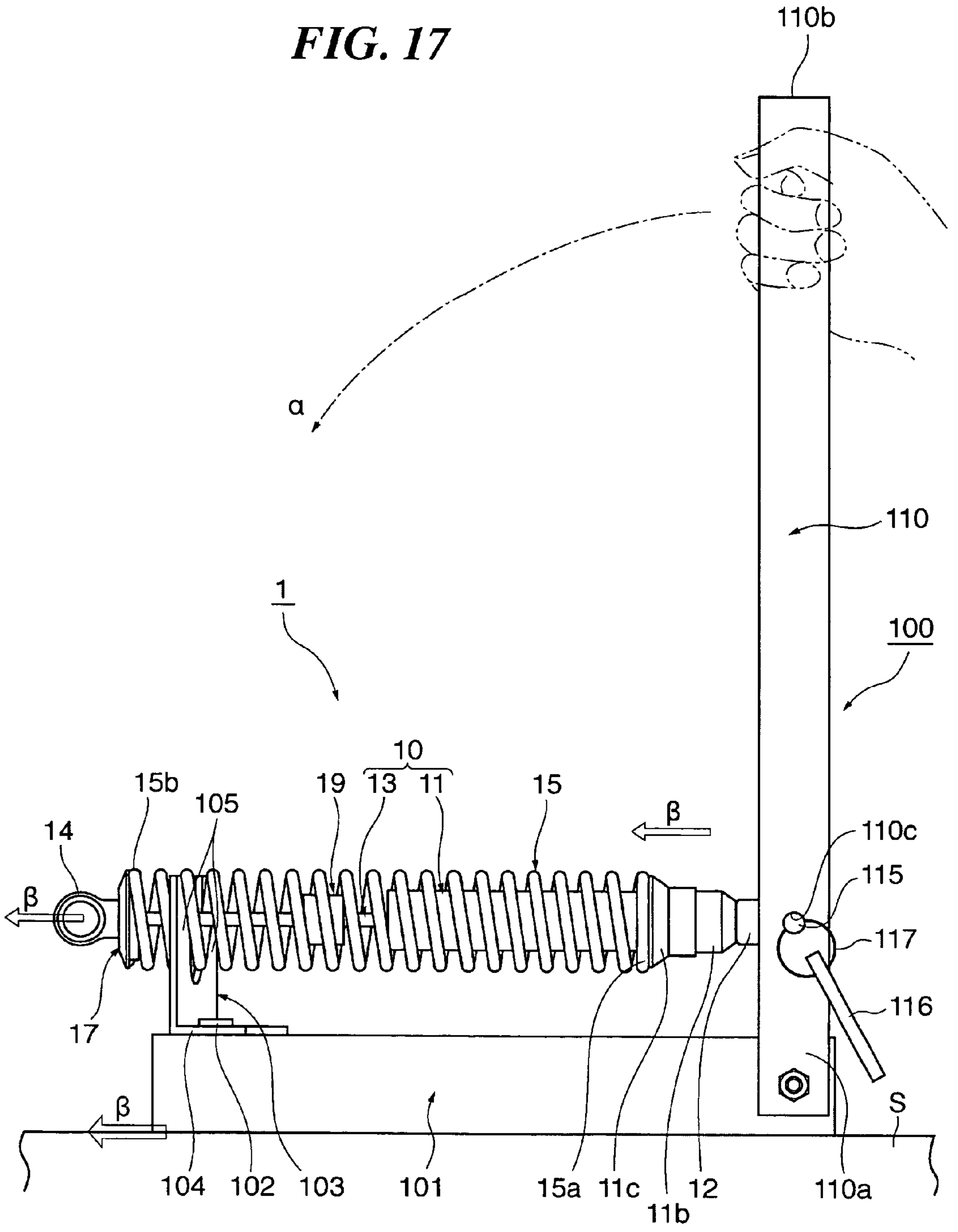
FIG. 17 is a side drawing showing the disassembling tool shown in FIG. 16 to which the shock absorber shown in FIG. 10 is attached.
Figure 18:
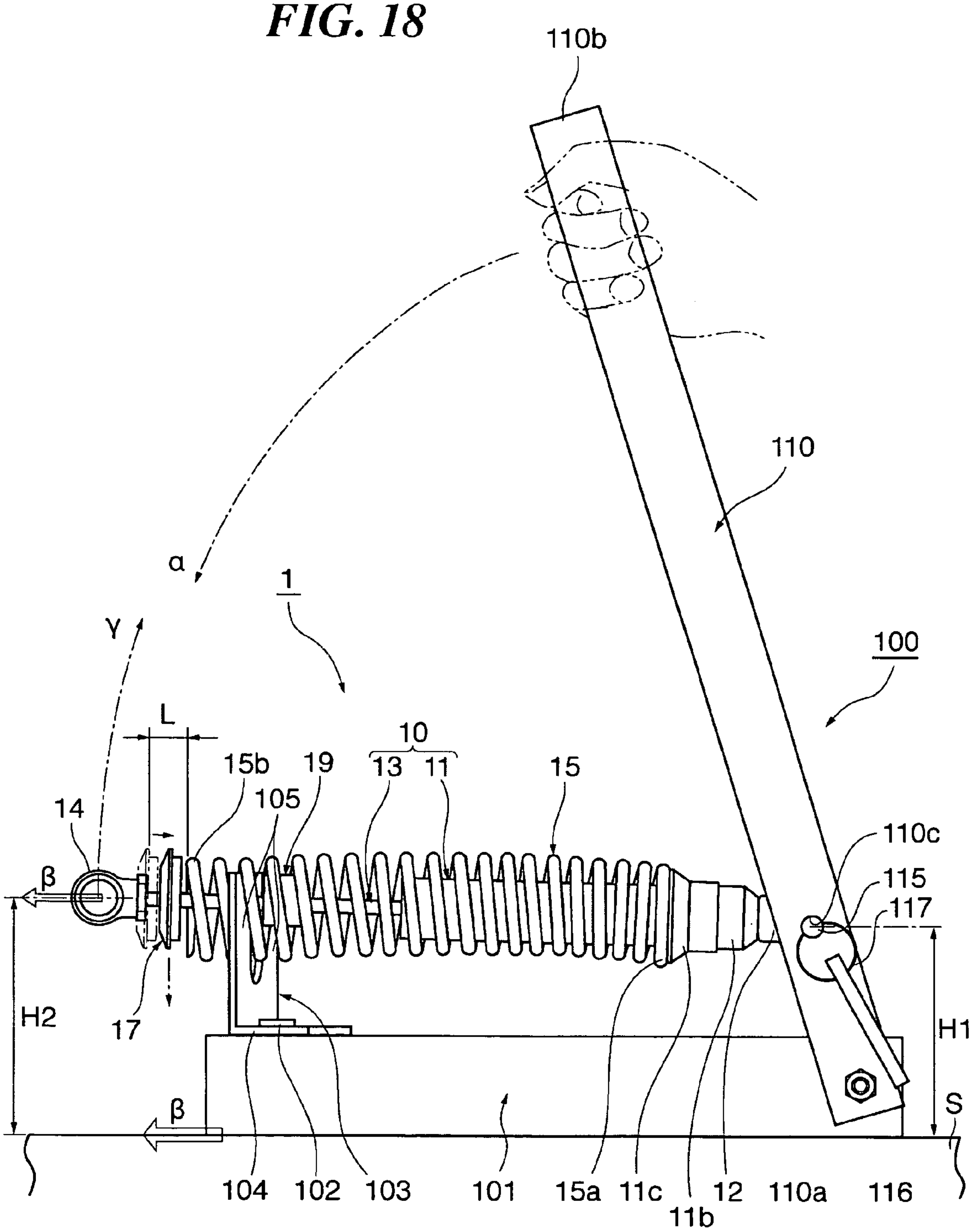
FIG. 18 is a side drawing showing a state in which the arm is pushed down from the state shown in FIG. 17 so as to detach the stopper from the disassembling tool.

The stepped pin 57 has a large diameter barrel 57*a* and a small diameter barrel 57*b* formed together, and holds the attaching portion 12 of the cylinder 11 of the damper 10 to the lever member 51. As shown FIGS. 2 and 3, the attaching portion 12 of the cylinder 11 is set between the supporting ends 53*a* of the bottom portion 53 of the lever member 51, and after aligning the attach holes 12*a* of the attaching portion 12 with the pin insert holes 53*c* of the supporting ends 53*a*, the large diameter barrel 57*a* or the small diameter barrel 57*b* of the stepped pin 57 selected according to the size of the attach holes 12*a* of the attaching portion 12 is inserted into the aligned holes (the large diameter barrel 57*s* is inserted in the figures). In this way, the attaching portion 12 of the cylinder 11 is easily attached to the bottom portion 53 of the lever member 51. Use of the stepped pin 57 has advantages for reducing the number of parts and lowering manufacturing cost than the disassembling tool 100 shown in FIGS. 16 to 18 which needs two pins 115 and 116.

Then, a way for disassembling the shock absorber 1 shown in FIG. 10 by using the aforementioned disassembling tool 30 will be explained with reference to FIGS. 4 to 6.

Figure 4:
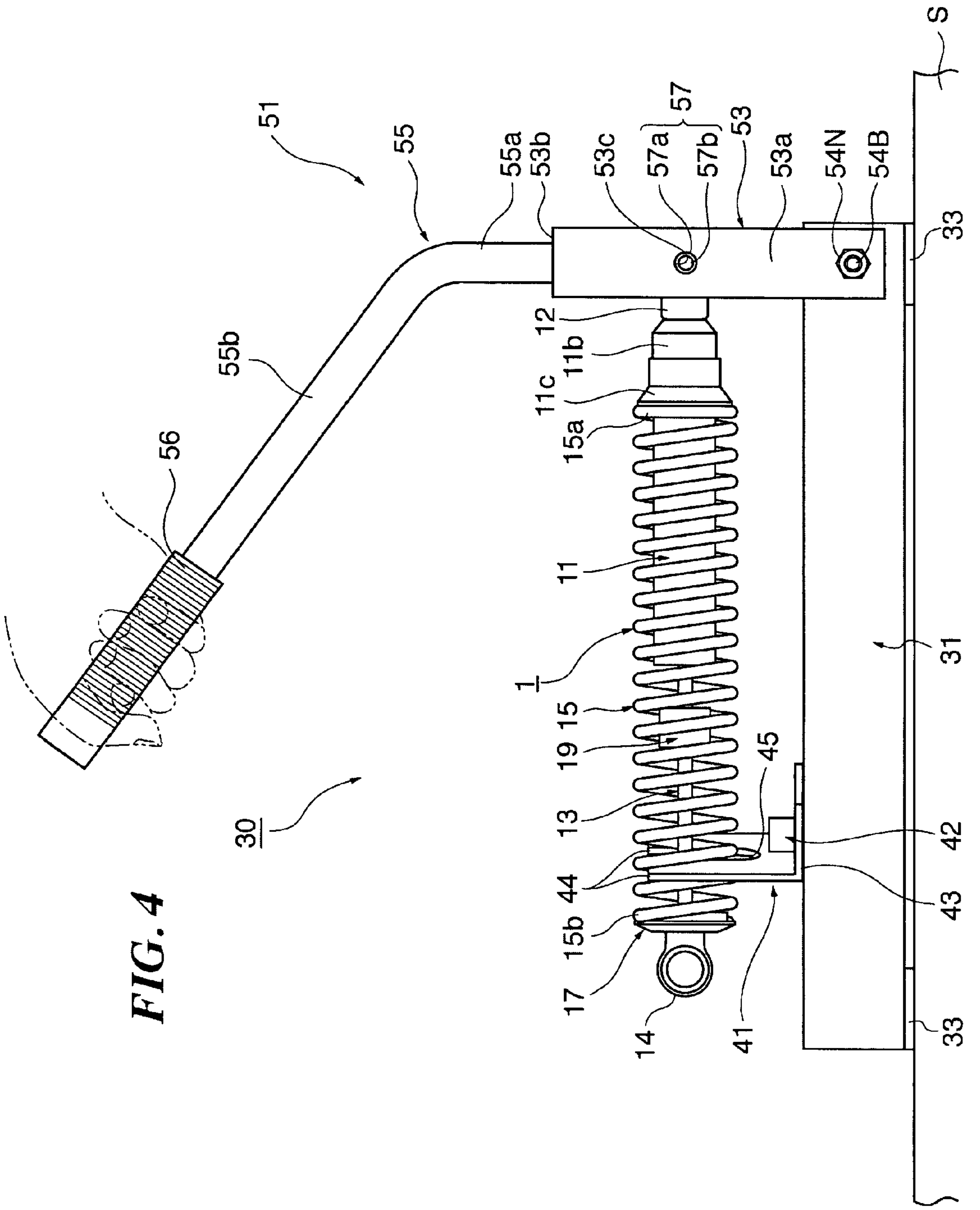
FIG. 4 is a side drawing showing the disassembling tool of FIG. 1 to which a shock absorber is set.

First, as shown in FIG. 4, the disassembling tool 30 is substantially horizontally placed on a working bench S, and the shock absorber 1 is placed on the base 31 with the cylinder 11 of the damper 10 being placed at a side of the lever member 51 and the rod 13 being placed at a side of the spring hold member 41. Then, the attaching portion 12 of the cylinder 11 is placed between the supporting ends 53*a* of the bottom portion 53 of the lever member 51 and fixedly attached to the bottom portion 53 by using the stepped pin 57 as described above (in FIGS. 4 to 6, the large diameter barrel 57*a* is inserted). And, the rod 13 is set in the vertical slit 45 of the spring hold member 41, and, simultaneously therewith, the inserting portion 44 of the spring hold member 41 is inserted between the coils of the coil spring 15 (for example between the second coil and the third coil). In this case, the spring hold member 41 is rotated around the male screw 42 so as to correspond to the orientation of the coil.

In a state shown in FIG. 4, the shock absorber 1 is situated in the disassembling tool 30 such that the cylinder 11 of the damper 10 is held to the lever member 51 by the stepped pin and the coil spring 15 presses against the inserting portion 44 of the spring held member 41. Then, on pushing down the grip 56 of the arm 55 of the lever member 51 rotatively in the direction of the arrow α in FIG. 5 by one hand, the proximal end 11*b* of the cylinder 11 is pushed in the direction of the arrow β in FIG. 5 and also the whole of the damper 10 is moved in the same direction of the arrow β.

The disassembling tool 30 is constructed such that the angle θ2 (shown in FIG. 5) between the bottom portion 53 of the lever member 51 and the upper surface of the base 31 is set in the range of about 75° to 88° at the beginning of the pushing down of the arm 55. And, as described above, the angle θ1 between the grip portion 55*b* of the arm 55, and the fixed portion 55*a* of the arm 55 and the bottom portion 53, is set in the range of about 45° to 55°. Setting such angles makes it easier to apply the force to the arm 55 at the beginning of the pushing down operation than the arm 110 of the disassembling tool 100 shown in FIGS. 16 to 18, resulting in easy operation.

Figure 5:
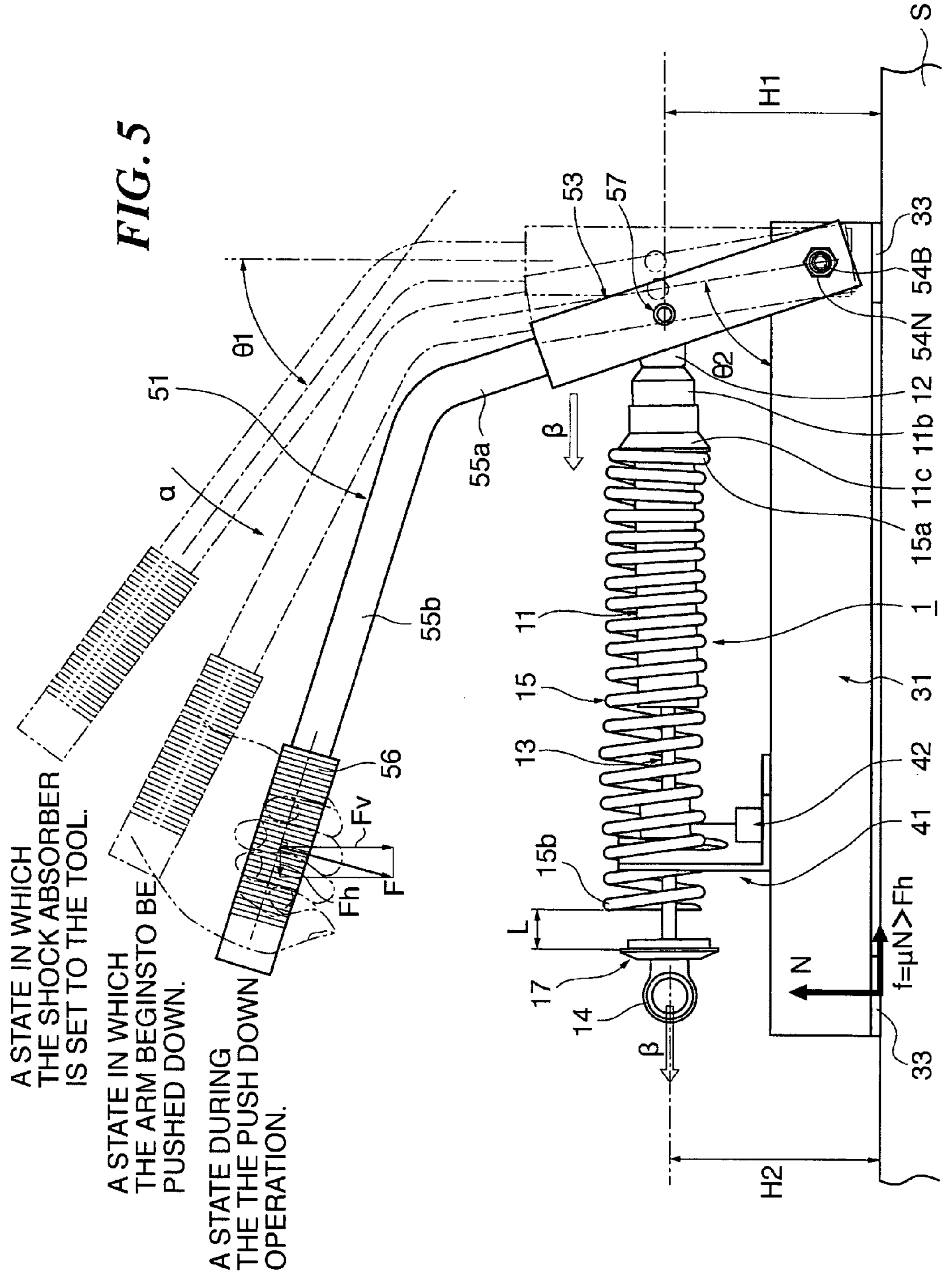
FIG. 5 is a side drawing showing the disassembling tool in which the arm of the disassembling tool is pushed down from a state of FIG. 4 (a state in which the shock absorber is set to the tool→a state in which the arm begins to be pushed down→a state during the pushing down operation).

When the cylinder 11 is pushed in the direction of the arrow β in FIG. 5 and thus the whole of the damper 10 is moved in the direction of the arrow β, the end 15*a* of the coil spring 15, which is pressed against the flange portion 11*c* of the cylinder 11, is pushed and thus the coil spring 15 is compressed between the inserting portion 44 of the spring hold member 41 and the flange portion 11*c*. During this operation, the orientation of the coil of the compressed coil spring 15 is changed. So, the spring hold member 41 is rotated along the orientation of the coil so that the coil spring 15 can be kept to be tightly supported between the flange portion 11*c* of the cylinder 11 and the inserting portion 44 of the spring hold member 41. Then, when the arm 55 is further pushed down in the direction of the arrow α, the damper 10 is further moved in the direction of the arrow β and thus the coil spring 15 is further compressed between the flange portion 11*c* of the cylinder 11 and the inserting portion 44 of the spring hold member 41. As a result, a gap L (as shown in FIGS. 5 and 6) is formed between the end 15*b* of the coil spring 15 and the stopper 17 which is engaged with the bottom portion 14*a* of the attach ring 14.

Figure 6:
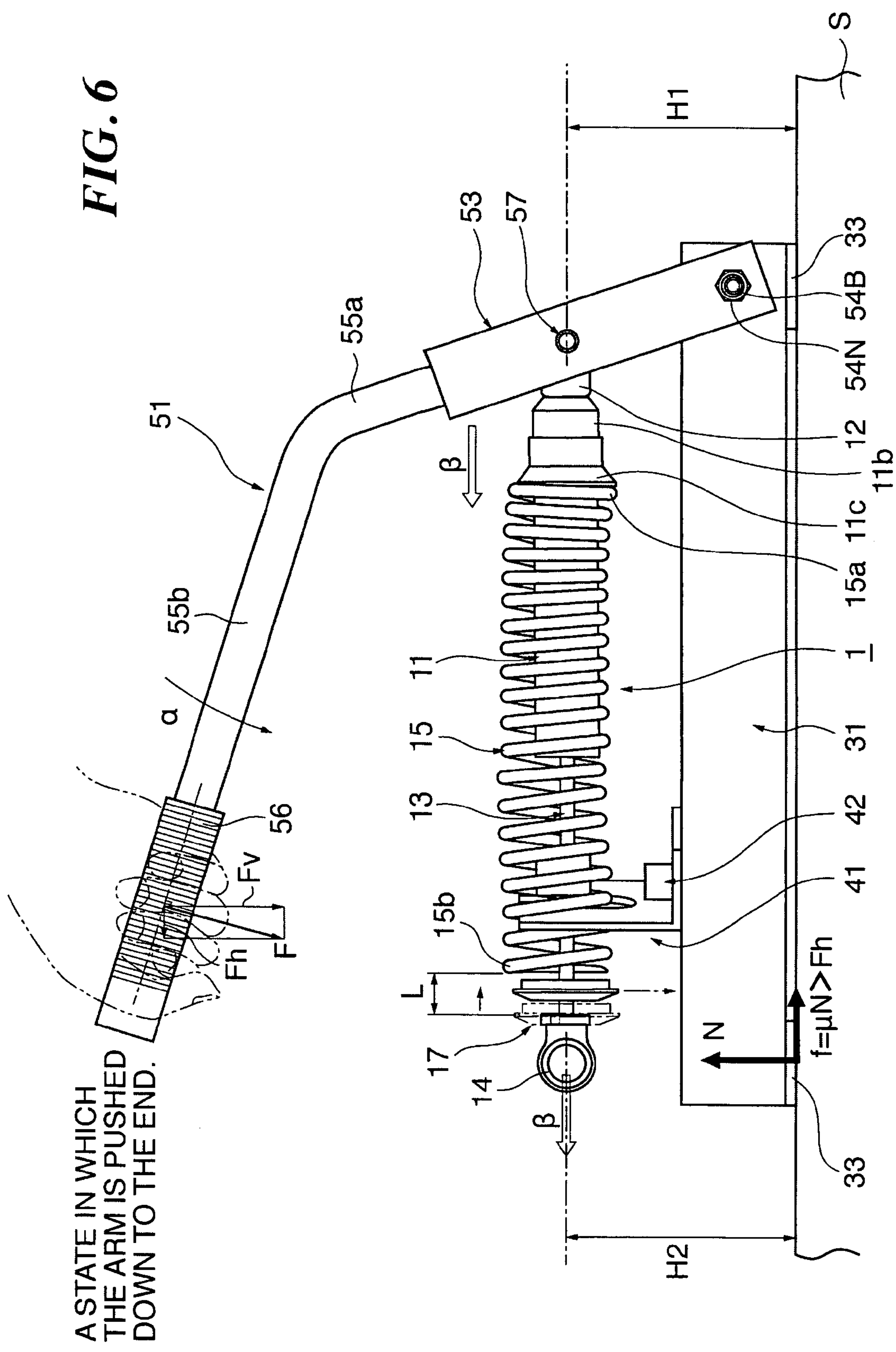
FIG. 6 is a side drawing showing the disassembling tool in which the arm is pushed down further for removing the stopper of the shock absorber (a state in which the arm is pushed down to the end→a state in which the stopper is removed).

In the processes for pushing down the arm 55 shown in FIGS. 5 and 6, during pushing down the arm 55, as shown in FIG. 5, a center height H2 of the attach ring 14 of the rod 13 is lower than a center height H1 of the attaching portion 12 of the cylinder 11 (H2<H1). And, at the time in which the arm 55 has been pushed down to the end, as shown in FIG. 6, the center height H2 of the attach ring 14 of the rod 13 is rather lower than or substantially equal to the center height H1 of the attach ring 12 of the cylinder 11 (H2≦H1). This can prevent the rod 13 from bouncing accompanied with the compression of the coil spring 15 so that the user can push down the arm 55 by one hand.

When the gap L is formed between the coil spring 15 and the stopper 17, the stopper 17 becomes free of spring force applied thereto. This enables to move the stopper 17 toward the end 15*b* of the coil spring 15 from the bottom portion 14*a* of the attach ring 14 and then to be detached from the rod 13 through the vertical slit 17, as shown in FIG. 6. In this procedure, since the rod 13 is prevented from bouncing as described above, the user can push down the arm 55 by one hand and remove the stopper 17 by another hand. After removing the stopper 17, the distal end of the rod 13 is lifted so as to disengage the coil spring 15 from the spring hold member 41. Then, the coil spring 15 is removed from the rod 13. As a result, the shock absorber 1 is disassembled into the damper 10, the coil spring 15 and the stopper 17 (shown in FIG. 10(B)).

In the disassembling operation described above, as shown in FIGS. 5 and 6, we assume that the arm 55 is pushed down by a push down force F (composed of a horizontal component Fh and a vertical component Fv). And, coefficient of static friction between the leg plates 33 of the base 31 and the upper surface of the working bench S is set to μ. A maximum friction force f between the leg plates 33 of the base 31 and the upper surface of the working bench S is represented by an equation; f=μN, wherein N represents normal force. In the disassembling tool 30, since the grip portion 55*b* of the arm 55 inclines with respect to the fixed portion 55*a* and the bottom portion 53 toward the base 31 (downward) at an angle θ1 (about 45° to 55°), the vertical component Fv of the push down force F becomes larger and the horizontal component Fh becomes smaller. Therefore, the horizontal component Fh of the push down force F may become smaller than the maximum friction force f=μN between the upper surface of the working bench S and the under surface of the leg plates 33 of the base 31. So, the disassembling tool 30 is prevented from slipping on the working bench S when the arm 55 is pushed down. This causes easy and smooth disassembling work.

Figure 7:
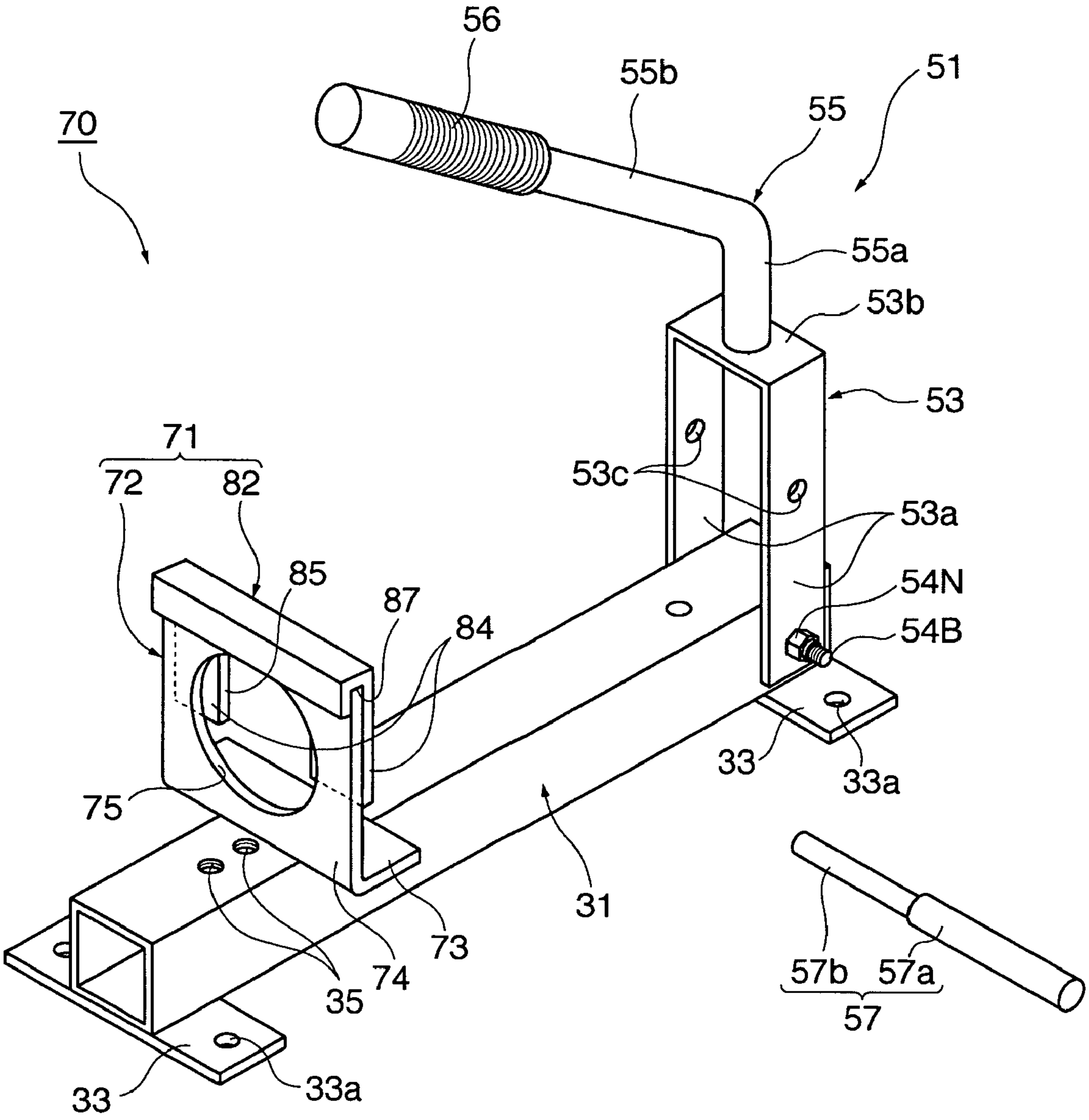
FIG. 7 is a perspective drawing showing a whole structure of a disassembling tool according to another embodiment of the present invention.
Figure 8:
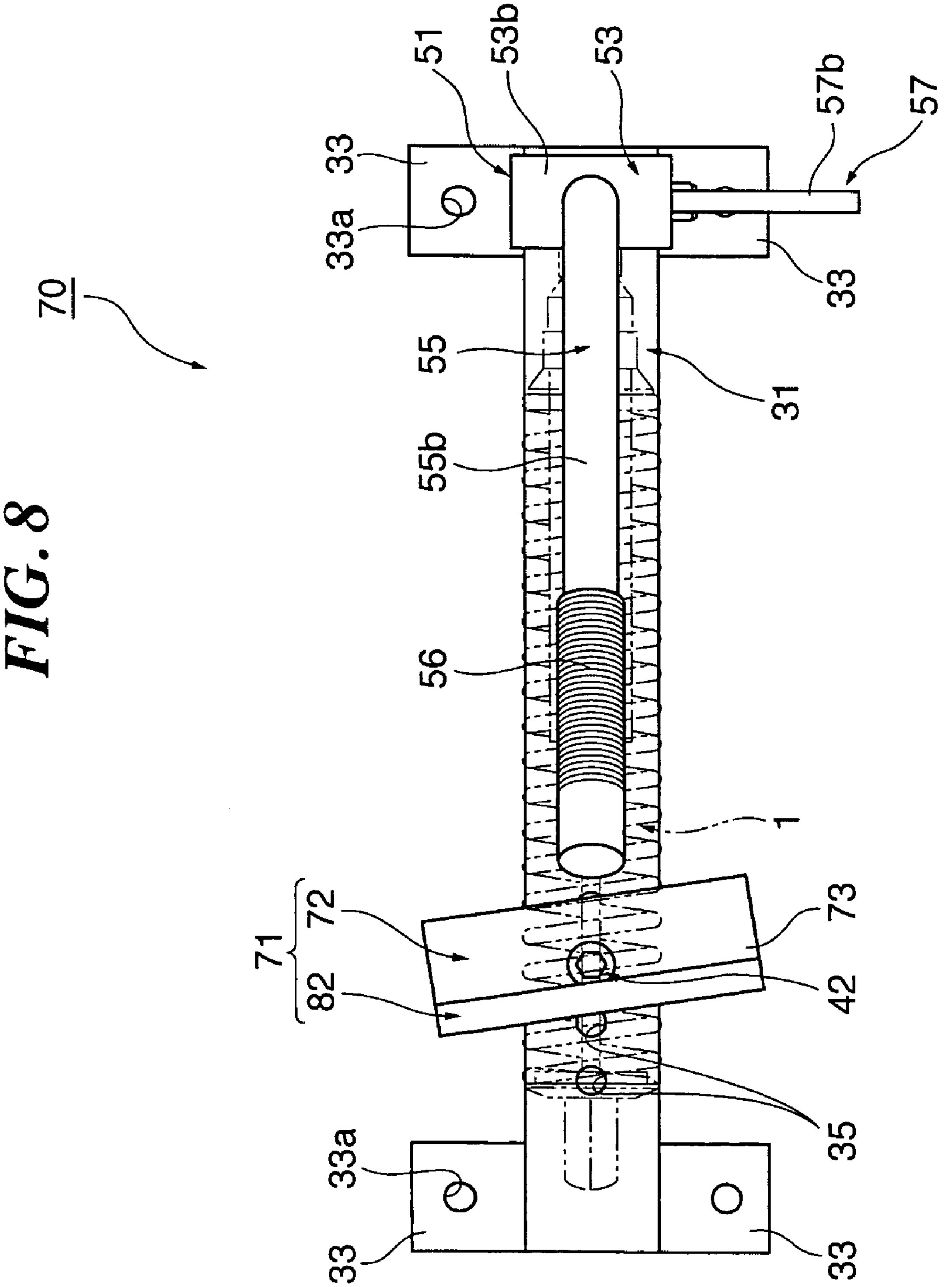
FIG. 8 is a plane drawing of the whole structure of the disassembling tool of FIG. 7.
Figure 9:
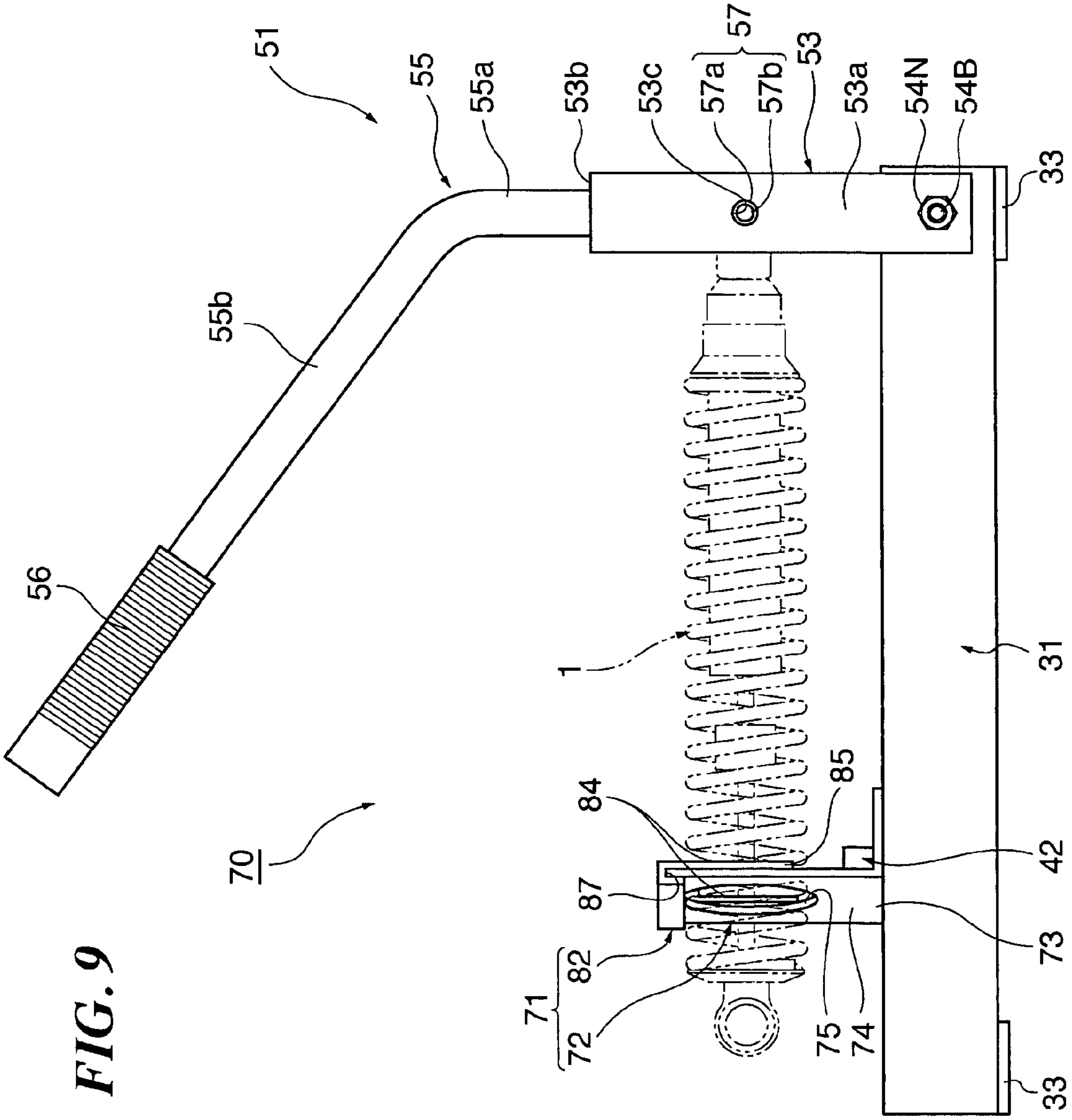
FIG. 9 is a side drawing of the whole structure of the disassembling tool of FIG. 7.

Next, another embodiment of the disassembling tool according to the present invention will be explained referring to FIGS. 7 to 9.

The disassembling tool 70 shown in the figures has the same structures as the aforementioned disassembling tool 30 except for a structure of the spring hold member 71.

The spring hold member 71 of the disassembling tool 70 is provided with a supporting member 72 and a thrust plate member 82. The supporting member 72 is L-shaped and has a base portion 73, to which the male screw 42 is penetrated, and an upright portion 74 standing from the base portion 73. The upright portion 74 is formed with an opening 75 at its center. The supporting member 72 is rotatable around the male screw 42 relative to the base 31. The thrust plate member 82 has an inserting portion 84 which is formed with a vertical slit 85 at its center. The upper edge of the thrust plate member 82 is folded back to form an engagement concave portion 87 which is engaged with the upper edge of the upright portion 74 of the supporting portion 72.

In the disassembling tool 70 provided with such the spring hold member 71, the shock absorber 1 is attached in the following manner. After passing the distal end of the rod 13 into the opening 75 of the supporting member 72, the thrust plate member 82 is attached to the supporting member 72 by engaging the concave portion 87 of the thrust plate member 82 with the upper edge of the upright portion 74 of the supporting member 72. Since the distal end of the rod 13 is passed through the opening 75 of the supporting member 72, if the distal end of the rod 13 is bounced accompanied with compression of the coil spring 15, the rod 13 is locked by the upper edge of the opening 75 of the supporting member 72 and immovably held.

Next, still other embodiment of the disassembling tool according to the present invention will be explained referring to FIG. 11. In this disassembling tool, the attaching portion 12 of the shock absorber is attached to the tool by mounting screws 61 in exchange for the stepped pin 57.

Figure 11:
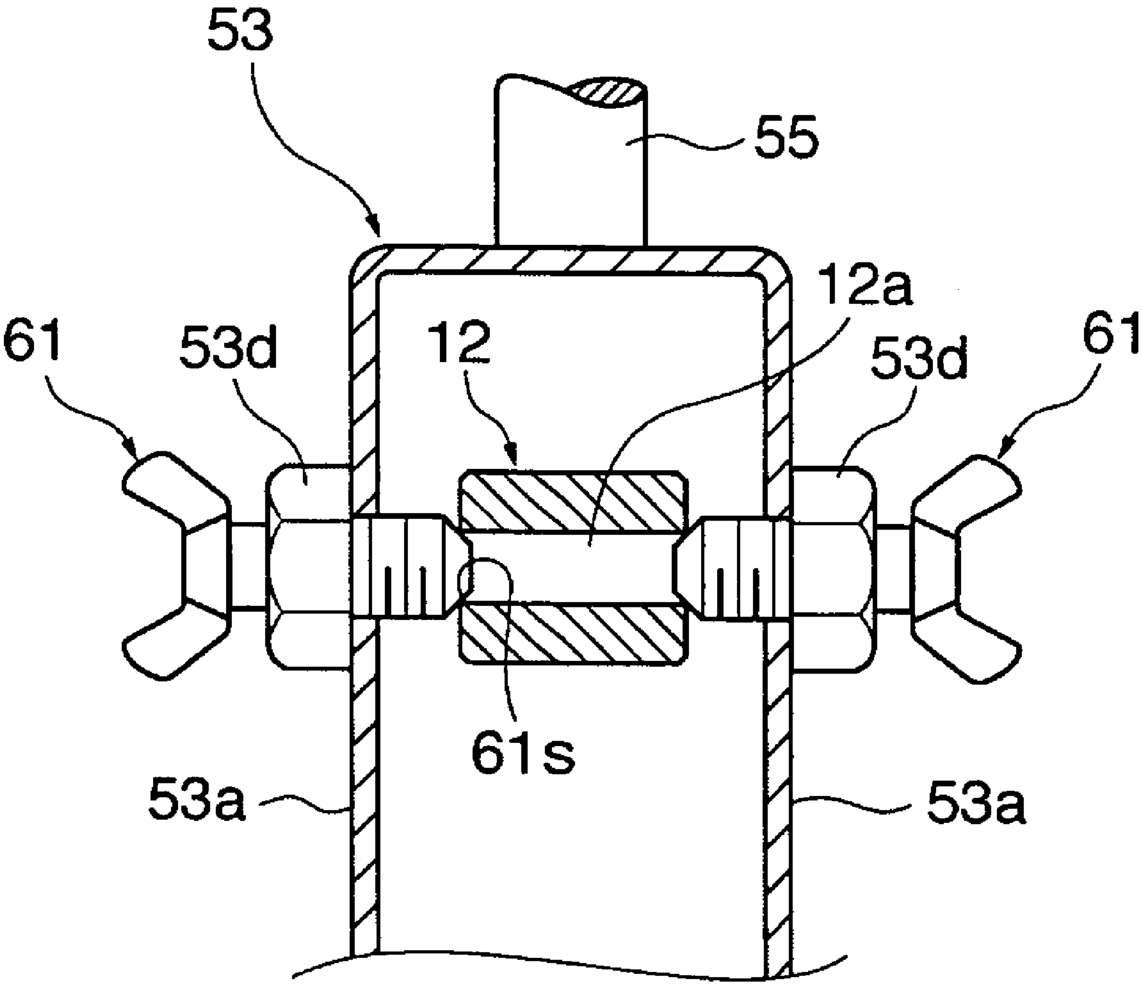
FIG. 11 is a vertical sectional drawing showing an another structure of a bottom portion 53 of the lever member 51 (shown in FIG. 1) viewed from an arrow of A in FIG. 1.

As shown in FIG. 11, in this lever member 51 according to this embodiment, a nut type screw supporting portion 53*d* is formed at each outer surface of the facing supporting ends 53*a* of the bottom portion 53. The nut type screw supporting portion 53 has a female thread inner bore. With each of the screw supporting portion 53*d*, a thumbscrew type mounting screw 61 is engaged. The mounting screw 61 has a tapered distal end 61*s*. As shown in FIG. 11, the tapered distal ends 61*s* of the mounting screws 61 are faced each other.

Figure 10A:
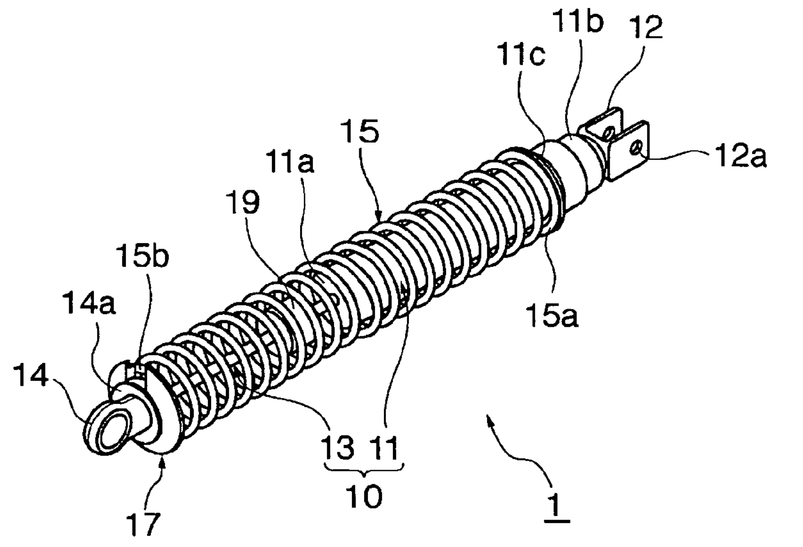
FIG. 10(A) is an overall perspective drawing and FIG. 10(B) is an exploded perspective drawing.
Figure 10B:
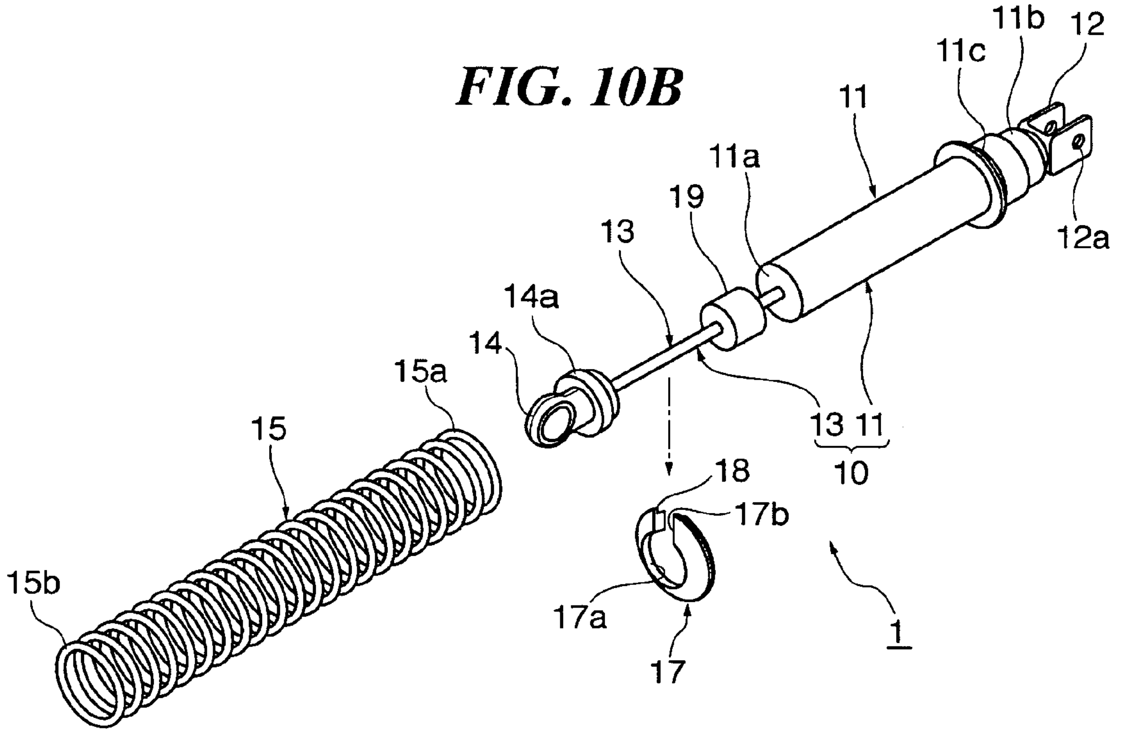

In thus structured disassembling tool shown in FIG. 11, the mounting screws 61 are screwed in the direction in which both the distal ends 61*s* come close to each other so that the distal ends 61*s* of the mounting screws 61 are inserted into the attach holes 12*a* of the attaching portion 12 of the shock absorber (shown in FIG. 10). This causes the attaching portion 12 of the shock absorber to be supported to the tool.

As described above, since the tapered distal ends 61*s* of the mounting screws 61 are so tightly engaged with the attach holes 12*a* that no clearance will be made between the tapered distal ends 61*s* and the inner surfaces of the attach holes 14*a*, the shock absorber can be stably set to the tool. And, the tapered distal end 61*s* can meet variations in the inner diameter of the attach hole 12*a* of the shock absorber. And, the mounting screw 61 is a thumbscrew type so as to be easily rotated by hand.

Another embodiment of the spring hold member will be explained referring to FIGS. 12 to 14.

Figure 12:
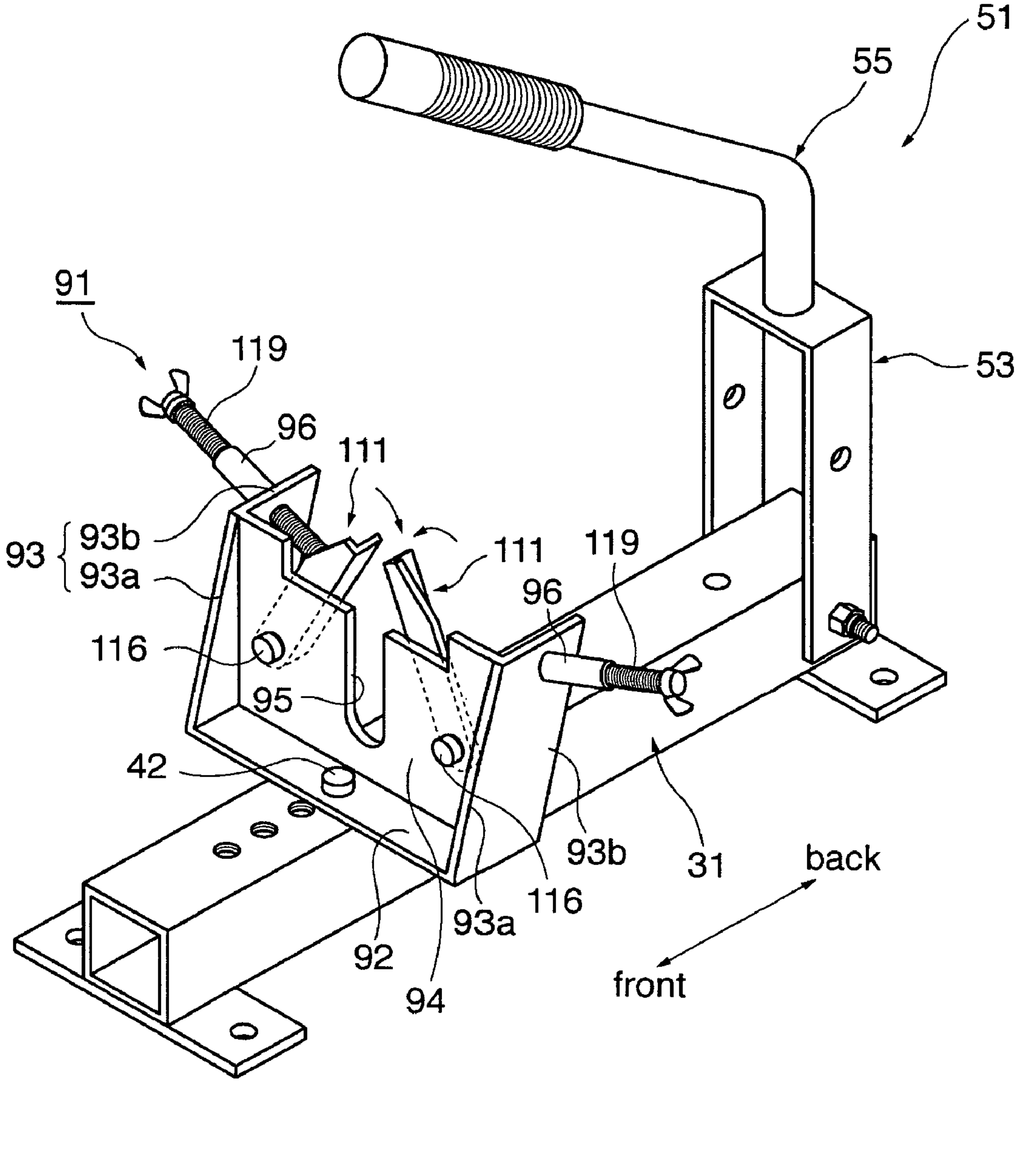
FIG. 12 is a perspective drawing showing another embodiment of the spring hold member.

As shown in FIG. 12, a spring hold member 91 according to the this embodiment is an improved part of the spring hold member 41 by providing sidewalls 93 to the both sides of the spring hold member 41 for enhancing rigidly of the tool. And, the spring hold member 91 has one pair of holding members (centering means) 111 for pressing the outer surface of the coil spring 15 (showing in FIG. 13(B)).

The structure of the spring hold member 91 will be explained. The spring hold member 91 shown in FIG. 12 is provided with a slit 95, into which the rod 13 (shown in FIG. 10) of the shock absorber is set, and an inserting portion 94 on the both sides of the slit 95, as with the spring hold member 41 of FIG. 1. The inserting portion 94 is formed with a base portion 92, at its lower edge, projecting horizontally (in the front direction in FIG. 12). The base portion 92 is attached to the base 31 by a male screw 42 at its center in the right and left direction.

Figure 14:
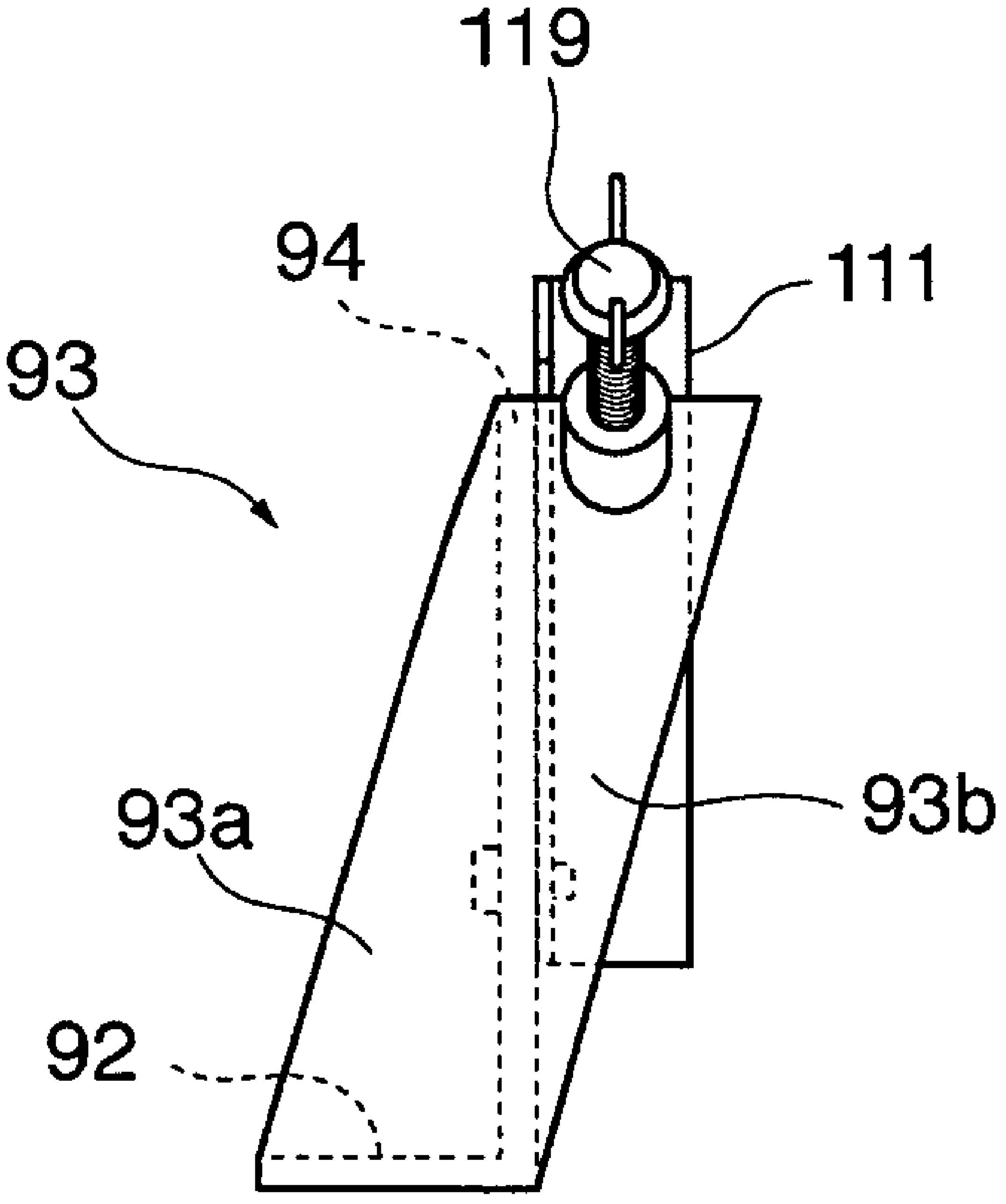
FIG. 14 is a left side drawing showing the spring hold member of FIG. 13.

The spring hold member 91 is provided with the sidewalls 93 each having a parallelogram shape as shown in FIG. 14. The sidewall 93 has a triangle rib 93*a* connected the side edges of the inserting portion 94 and the base portion 92, and an inverted triangle rib 93*b* opposite to the triangle rib 93 behind the side edge of the inserting portion 94. The rib 93*b* is a structure for attaching the adjustment screw 119 (describe bellow in detail).

Figure 13A:
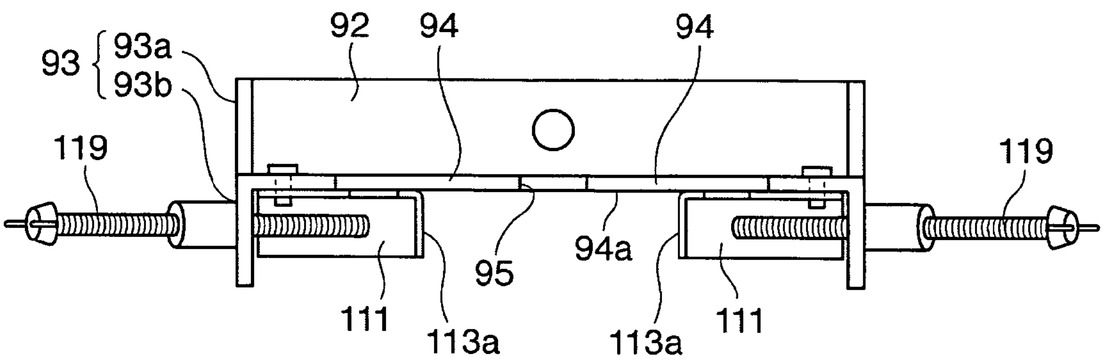
FIG. 13(A) is a plane drawing showing the spring hold member of FIG. 12

As shown in FIG. 13(A), one pair of holding members 111 are arranged on the inner surface 94*a* of the inserting portion 94 (the surface facing the lever member 51) so as to sandwich the coil spring 15 of the shock absorber therebetween.

The structure of the holding member 111 will be explained. The holding member 111 is made of a steel product having a L-shaped cross-section and is provided with a sidewall 112, which is in contact with the inner surface 94*a* of the inserting portion 94, and a base wall 113 projecting from the inner surface 94*a* substantially perpendicular to the sidewall 112.

Figure 13B:
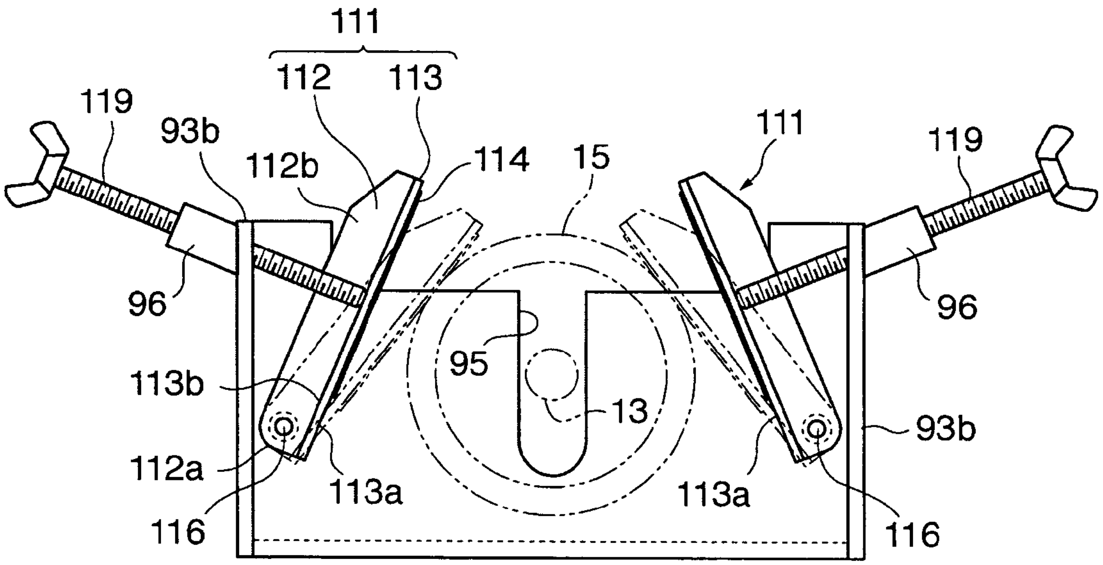
FIG. 13(B) is a front drawing showing the spring hold member of FIG. 12.

As shown in FIG. 13(B), the sidewall 112 is rotatably attached to the inserting portion 94 by a pin 116 at its proximal end 112*a* (the lower end of the figure). So, the holding member 111 is rotatable around the pin 116 with in contact with the inner surface 94*a* of the inserting portion 94. The distal end 112*b* (the upper end of the figure) of the sidewall 112 is chamfered at 40 to 45°, for example. As mentioned later, the under surface 113*a* of the base wall 113 of the holding member 111 is in contact with the outer surface of the coil spring 15. So, in order to prevent the coil spring from damaging, a sheet material 114 such as rubber sheet and sponge sheet is adhered to the under surface 113*a*.

As shown in FIG. 13(B), the holding members 111 are pressed against the coil spring by long thumbscrew type adjustment screws 119 which are attached to the ribs 93*b*.

A nut type screw supporting portions 96 is obliquely attached to each outer surface of the ribs 93*b*. The adjustment screws 119 are engaged with the screw supporting portion 96 with the distal ends thereof being projected obliquely downward. On screwing the adjustment screws 119 toward the holding members 111, the distal ends of the screws 119 are butted against the upper surfaces 113*b* of the base walls 113 of the holding members 111.

The angle of the adjustment screw 119 relative to the horizontal is not limited; however, the angle is preferably set such that when the under surface 113*a* of the base wall 113 is in contact with the outer surface of the coil spring 15 (shown by imaginary line in FIG. 13), the adjustment screw 119 is substantially perpendicular to the base wall 113 (an angle between the base wall 113 and the adjustment screw 119 is preferably 90°±15°). This allows the adjustment screw 119 to press against the holding member 111 stably.

In thus structured spring hold member 91, as shown in FIG. 13(B), in a state in which the rod 13 of the shock absorber is set in the slit 95, the holding members 111 press (sandwich) the coil spring 15 from both side obliquely downward so that the rod 13 can be centered in the slit 95. And, since the coil spring 15 is pressed by the under surfaces 113*a* of the base walls 113 of the holding members 111 obliquely downward at two positions around the upper outer surface thereof, the coil spring 15 is pressed downward.

As described above (as shown in FIG. 2), in the disassembling tools according to the present invention, the inserting portion 44 (94) is set obliquely relative to an axis of the coil spring 15 so as to correspond to the orientation of the coil of the coil spring 15. So, when the arm 55 is pushed down, the coil spring 15 may be applied with lateral force (force in the direction of an arrow B in FIG. 2) and thus the rod 13 may be displaced in the same direction.

However, since the spring hold member 91 shown in FIGS. 12 to 14 allows centering of the coil spring 15, the displacement of the rod 13 in the lateral direction may be prevented. And, since the rod 13 is not in contact with the inner edge of the slit 95, the rod 13 can be prevented from damaging and the work can be conducted smoothly. Furthermore, since the rod 13 is centered, the coil spring 15 is prevented from being applied with offset load.

In addition, since the coil spring 15 is pressed downward by the holding members 111, the shock absorber is prevented from bouncing during the disassembling work.

The spring hold member 91 is reinforced with the sidewalls 93 on the both sides of the inserting portion 94 so as to have sufficient rigidly. Thus structured spring hold member 91 allows the board thickness of the inserting portion 94 thinner than that of the spring hold member 41 shown in FIG. 1. The thin inserting portion 94 allows the coil spring 15 to be set on the spring hold member 91 even if the coil spring 15 has a narrow pitch. So, the spring hold member 94 can meet variations of the shock absorber.

In addition, it becomes possible to enlarge the width of the spring hold member 91 (the insertion portion 94) while keeping the rigidity of the member. This allows to meet the shock absorber equipped with a coil spring having a larger diameter.

Next, still another embodiment of the disassembling tool according to the present invention will be explained referring to FIG. 15.

Figure 15:
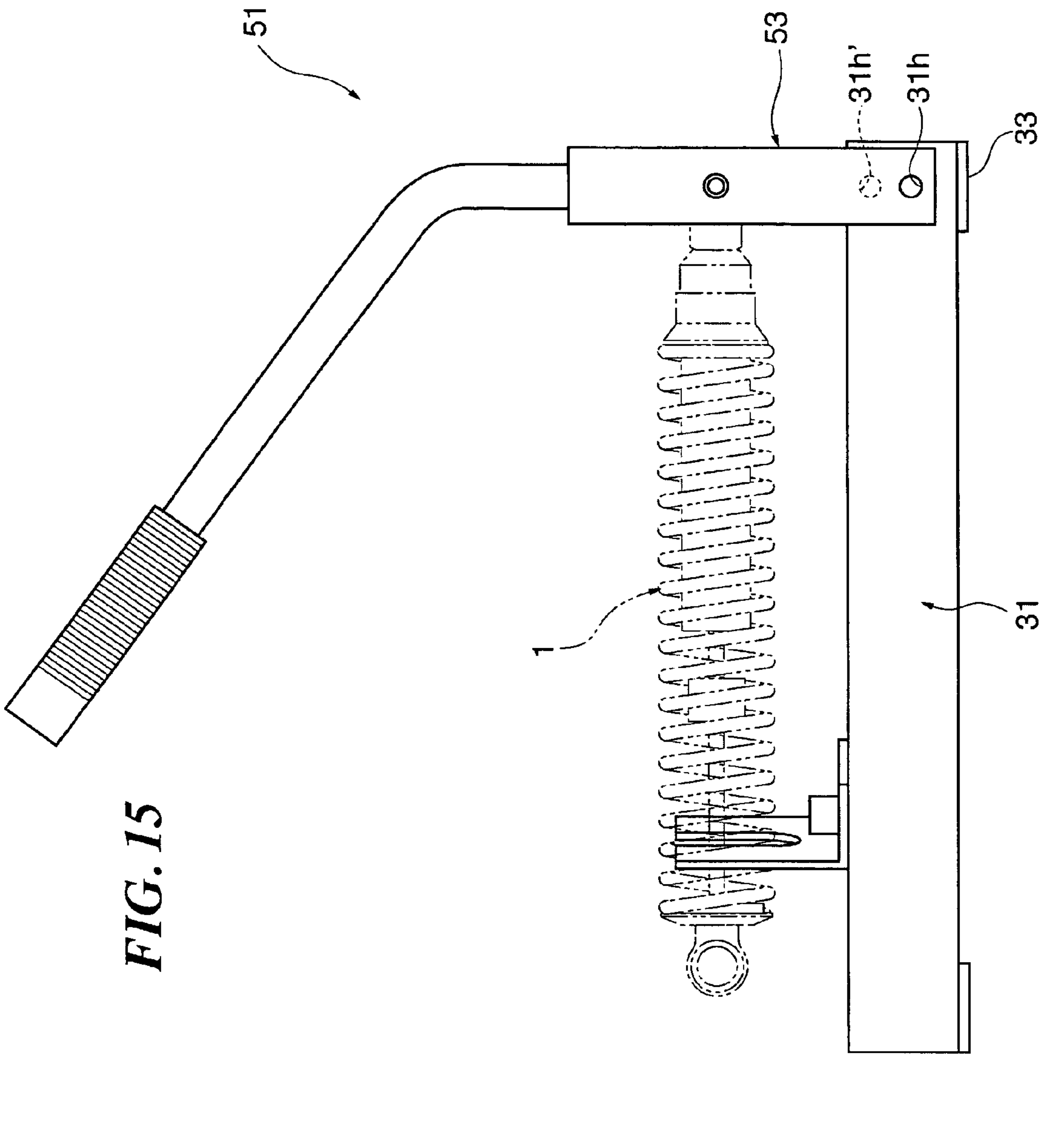
FIG. 15 is a side drawing showing a disassembling tool according to still another embodiment of the present invention.

In this disassembling tool shown in FIG. 15, the base 31 is formed with holes 31*h* and 31*h*', penetrating transversely and arranged in the height direction of the base, at one end (the right end in the figure) thereof. This allows the attachment position of the lever member 51 to the base 31 to be adjusted in the height direction of the base, whereby the type of the shock absorber to be disassembled is expand. In such a case where three or more of the holes are formed, fine adjustment of the attachment position can be performed.

What is claimed is:

1. A disassembling tool of a shock absorber, the shock absorber including i) a damper having a cylinder and a rod, the rod housed within the cylinder and projecting from said cylinder coaxially with said cylinder, and the rod moveable in a direction coaxial with the cylinder, movement of the rod being subject to a dampening force in a direction opposite the direction of the movement, and ii) a coil spring arranged around said damper and compressed between a proximal end of the cylinder and a stopper attached to a end of the rod, the disassembling tool comprising:

an elongated base extending along a horizontal axis having a first end, a second end opposite to the first end, and a surface extending between the first end and the second end, a vertical axis extending through said base proximate to the second end and perpendicular to the surface;

a spring hold member rotatably attached to said base on the surface at the vertical axis to pivot about the vertical axis, said spring hold member having i) an inserting portion configured to be inserted between coils of the coil spring of the shock absorber, and ii) a slit configured to receive the rod of the shock absorber; and a lever member having a bottom portion and an arm portion, the bottom portion rotatably attached at the first end of said base to pivot about a third axis through the base proximate to the first end and perpendicular to both the horizontal axis and the vertical axis, and the arm portion projecting from the bottom portion, wherein the arm portion has a distal length inclined in a direction toward the surface of said base running from the first end to the second end, and wherein the bottom portion is configured to connect to the cylinder of the shock absorber.

2. The disassembling tool of a shock absorber according to claim 1, wherein said spring hold member is detachably attached to said base, and a plurality of attachment positions of said spring hold member to said base are formed on said base in the length direction of said base.

3. The disassembling tool of a shock absorber according to claim 2, wherein said cylinder is formed with an attaching portion having an attach hole at the proximal end thereof, said bottom portion of said lever member is formed with a pin insert hole aligned with said attach hole, said disassembling tool further comprises a pin which is inserted in said aligned attach hole and pin insert hole for attaching said attaching portion to said bottom portion, and wherein said pin is a stepped pin having different diameter barrels.

4. The disassembling tool of a shock absorber according to claim 2, wherein, when said shock absorber is set in said base placed substantial horizontally and said arm of said lever member is pushed down so as to compress said coil spring between the proximal end of said cylinder and said inserting portion of said spring hold member, a center height of the distal end of said rod is lower than a center height of the proximal end of said cylinder during the pushing down of said arm, and the center height of the distal end of said rod is rather lower or substantially equal to the center height of the proximal end of said cylinder when said arm has been pushed down to the end.

5. The disassembling tool of a shock absorber according to claim 2, wherein said spring hold member has a supporting member rotatably attached to a vertical axis on one end of said base, and a thrust plate member detachably engaged with said supporting member, wherein said supporting member has an opening into which the distal end of said rod is passed, and wherein said thrust plate member has a slit into which said rod is set, and an inserting portion which is inserted between the coils of said coil spring.

6. The disassembling tool of a shock absorber according to claim 2, wherein mounting screws, each having a tapered distal end, are attached to said bottom portion facing each other, and wherein the tapered distal ends of said mounting screws are inserted into the attach holes of the proximal end of said cylinder from both sides so as to hold the proximal end of said cylinder to said bottom portion.

7. The disassembling tool of a shock absorber according to claim 2, wherein said spring hold member has a rod centering means for positioning said rod to a substantial center of said slit of said inserting portion in the right and left direction.

8. The disassembling tool of a shock absorber according to claim 2, wherein an attachment position of said lever member to said base is adjustable in the height direction of said base.

9. The disassembling tool of a shock absorber according to claim 1, wherein said cylinder is formed with an attaching portion having an attach hole at the proximal end thereof, said bottom portion of said lever member is formed with a pin insert hole aligned with said attach hole, said disassembling tool further comprises a pin which is inserted in said aligned attach hole and pin insert hole for attaching said attaching portion to said bottom portion, and wherein said pin is a stepped pin having different diameter barrels.

10. The disassembling tool of a shock absorber according to claim 9, wherein, when said shock absorber is set in said base placed substantial horizontally and said arm of said lever member is pushed down so as to compress said coil spring between the proximal end of said cylinder and said inserting portion of said spring hold member, a center height of the distal end of said rod is lower than a center height of the proximal end of said cylinder during the pushing down of said arm, and the center height of the distal end of said rod is rather lower or substantially equal to the center height of the proximal end of said cylinder when said arm has been pushed down to the end.

11. The disassembling tool of a shock absorber according to claim 1, wherein, when said shock absorber is set in said base placed substantial horizontally and said arm of said lever member is pushed down so as to compress said coil spring between the proximal end of said cylinder and said inserting portion of said spring hold member, a center height of the distal end of said rod is lower than a center height of the proximal end of said cylinder during the pushing down of said arm, and wherein the center height of the distal end of said rod is rather lower or substantially equal to the center height of the proximal end of said cylinder when said.arm has been pushed down to the end.

12. The disassembling tool of a shock absorber according to claim 11, wherein an angle between said bottom portion and an upper surface of said base is set in the range of about 75° to 88° at the beginning of the pushing down of said arm.

13. The disassembling tool of a shock absorber according to claim 12, wherein said arm has a fixed portion (a fixed end) which is fixed to said bottom portion, and a grip portion (a free end) obliquely projecting from said fixed portion, and wherein an angle between said grip portion and said bottom portion is set in the range of about 45° to 55°.

14. The disassembling tool of a shock absorber according to claim 1, wherein said spring hold member has a supporting member rotatably attached to a vertical axis on one end of said base, and a thrust plate member detachably engaged with said supporting member, wherein said supporting member has an opening into which the distal end of said rod is passed, and wherein said thrust plate member has a slit into which said rod is set, and an inserting portion which is inserted between the coils of said coil spring.

15. The disassembling tool of a shock absorber according to claim 1, wherein mounting screws, each having a tapered distal end, are attached to said bottom portion facing each other, and wherein the tapered distal ends of said mounting screws are inserted into the attach holes of the proximal end of said cylinder from both sides so as to hold the proximal end of said cylinder to said bottom portion.

16. The disassembling tool of a shock absorber according to claim 15, wherein said mounting screw is a thumbscrew type screw.

17. The disassembling tool of a shock absorber according to claim 1, wherein said spring hold member has a rod centering means for positioning said rod to a substantial center of said slit of said inserting portion in the right and left direction.

18. The disassembling tool of a shock absorber according to claim 17, wherein said rod centering means comprises one pair of hold members which are oppositely arranged on both sides of said coil spring, and wherein said hold members sandwich said coil spring there between and also hold said coil spring downward.

19. The disassembling tool of a shock absorber according to claim 1, wherein an attachment position of said lever member to said base is adjustable in the height direction of said base.

20. A disassembling tool of a shock absorber, comprising:

a rectilineal channel element extending along a first axis and having a first end, a second end opposite said first end, a top surface between the first end and the second end, the top surface having a plurality of threaded holes in alignment with the first axis, a bottom surface facing opposite the top surface, a first side surface, and a second side surface opposite the first side surface;

an L-shape member, having a base portion, and an inserting portion substantially perpendicular to the base portion, the base portion rotatably fastened to the top surface about a removable fastener penetrating the base portion and engaged to one of the plurality of threaded holes, and the inserting portion having a slit open at an end opposite the base portion and bisecting the inserting portion;

a lever member having i) a bracket element including a connecting first member, a connecting second member parallel to and facing said.first member, and a connecting member connecting a top end of the first member to a top end of the second member, the first member and the second member each having a mounting hole proximate to centers of the first member and the second member, respectively, the first member and the second member pivotally attached to the first side surface and the second side surface, respectively, about a second axis through the first side surface and the second side surface, the second axis proximate to the first end and perpendicular to the first axis, and ii) a handle element attached to the connecting member of the bracket element and extending opposite the first member and the second member, wherein, a forward rotation of said lever member about the second axis brings a forwardfacing surface of the handle member toward the top surface of the channel element running from the first end to the second end, and the handle element of the lever member having an elbow portion bending in a direction of the forward rotation.

* * * * *